(12) United States Patent
Nakao et al.

(10) Patent No.: US 7,756,106 B2
(45) Date of Patent: Jul. 13, 2010

(54) COMMUNICATION TERMINAL, CONTROL METHOD OF COMMUNICATION TERMINAL, AND CONTROL PROGRAM OF COMMUNICATION TERMINAL

(75) Inventors: Muneki Nakao, Chiba (JP); Yosuke Ezumi, Tokyo (JP); Tomoyuki Takeda, Tokyo (JP); Yoshiyuki Hirai, Tokyo (JP); Shinya Kogure, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1389 days.

(21) Appl. No.: 10/878,601

(22) Filed: Jun. 29, 2004

(65) Prior Publication Data

US 2005/0018657 A1 Jan. 27, 2005

(30) Foreign Application Priority Data

Jun. 30, 2003 (JP) ............................. 2003-186069

(51) Int. Cl.
*H04L 12/66* (2006.01)
(52) U.S. Cl. .................. 370/352; 370/401; 379/114.12; 709/230; 709/246
(58) Field of Classification Search ................. 370/352, 370/395.52, 401; 379/265.09, 114.12; 709/246, 709/230
See application file for complete search history.

(56) References Cited

U.S. PATENT DOCUMENTS

| | | | |
|---|---|---|---|
| 5,918,009 A * | 6/1999 | Gehani et al. .................... 726/8 |
| 6,240,444 B1 * | 5/2001 | Fin et al. ...................... 709/205 |
| 6,425,131 B2 * | 7/2002 | Crandall et al. ............. 725/106 |
| 6,542,165 B1 | 4/2003 | Ohkado | |
| 6,704,024 B2 * | 3/2004 | Robotham et al. ........... 345/581 |
| 6,779,025 B1 * | 8/2004 | Wolfe et al. ................. 709/219 |
| 7,212,521 B2 * | 5/2007 | Kwon ......................... 370/352 |
| 7,257,217 B1 * | 8/2007 | Lee ......................... 379/265.01 |
| 7,328,281 B2 * | 2/2008 | Takeda et al. ................ 709/246 |
| 7,349,412 B1 * | 3/2008 | Jones et al. .................. 370/401 |
| 7,362,853 B2 * | 4/2008 | Halkosaari ............. 379/114.12 |

(Continued)

FOREIGN PATENT DOCUMENTS

JP 11-306116 11/1999

(Continued)

OTHER PUBLICATIONS

U.S. Appl. No. 10/813,606, filed Mar. 31, 2004.

*Primary Examiner*—Gerald Gauthier
(74) *Attorney, Agent, or Firm*—Fitzpatrick, Cella, Harper & Scinto

(57) ABSTRACT

A communication apparatus which performs IP communication and analog communication through an ADSL gateway obtains an IP address of a party station from an SIP proxy and transmits/receives communication data with the party station on an IP network based on a file transmission/reception protocol such as FTP or HTTP when a party station's telephone number corresponds to a VoIP network. The apparatus performs analog facsimile communication on a line switching network when the party station does not correspond to the VoIP network. Moreover, the apparatus performs the analog facsimile communication on the VoIP network or the line switching network when the party station corresponds to the VoIP network but does not have any digital communication means. Thus, in the apparatus corresponding to analog and network communication paths, it is possible to select an appropriate communication path and achieve high-speed and high-reliability communication without any complicated operation.

6 Claims, 23 Drawing Sheets

U.S. PATENT DOCUMENTS

| | | | |
|---|---|---|---|
| 7,391,762 B2* | 6/2008 | Ko | 370/352 |
| 7,675,906 B2* | 3/2010 | Higuchi | 370/352 |
| 2002/0045425 A1 | 4/2002 | Takeda et al. | 455/41 |
| 2002/0083098 A1* | 6/2002 | Nakamura | 707/513 |
| 2002/0115477 A1* | 8/2002 | Singh | 455/566 |
| 2002/0126654 A1* | 9/2002 | Preston et al. | 370/352 |
| 2002/0126656 A1* | 9/2002 | Park | 370/352 |
| 2002/0145753 A1 | 10/2002 | Inoue et al. | 358/1.15 |
| 2003/0009565 A1 | 1/2003 | Arao | |
| 2003/0051215 A1 | 3/2003 | Nakao | 715/513 |
| 2003/0182384 A1 | 9/2003 | Kogure et al. | 709/206 |
| 2003/0210678 A1* | 11/2003 | Haukka | 370/352 |
| 2004/0057421 A1* | 3/2004 | Kawabata et al. | 370/352 |
| 2004/0151165 A1 | 8/2004 | Ezumi | 370/352 |
| 2005/0018657 A1* | 1/2005 | Nakao et al. | 370/352 |
| 2005/0021626 A1* | 1/2005 | Prajapat et al. | 709/205 |
| 2006/0069808 A1* | 3/2006 | Mitchell et al. | 709/246 |
| 2006/0136596 A1* | 6/2006 | Izumi | 709/230 |
| 2006/0155864 A1* | 7/2006 | Izumi | 709/230 |

FOREIGN PATENT DOCUMENTS

| | | |
|---|---|---|
| JP | 2000-047991 | 2/2000 |
| JP | 2000-341341 | 12/2000 |
| JP | 2002-149640 | 5/2002 |
| JP | 2003-016021 | 1/2003 |
| JP | 2003-22250 | 1/2003 |
| JP | 2003-044429 | 2/2003 |
| JP | 2003-122551 | 4/2003 |

* cited by examiner

FIG. 17

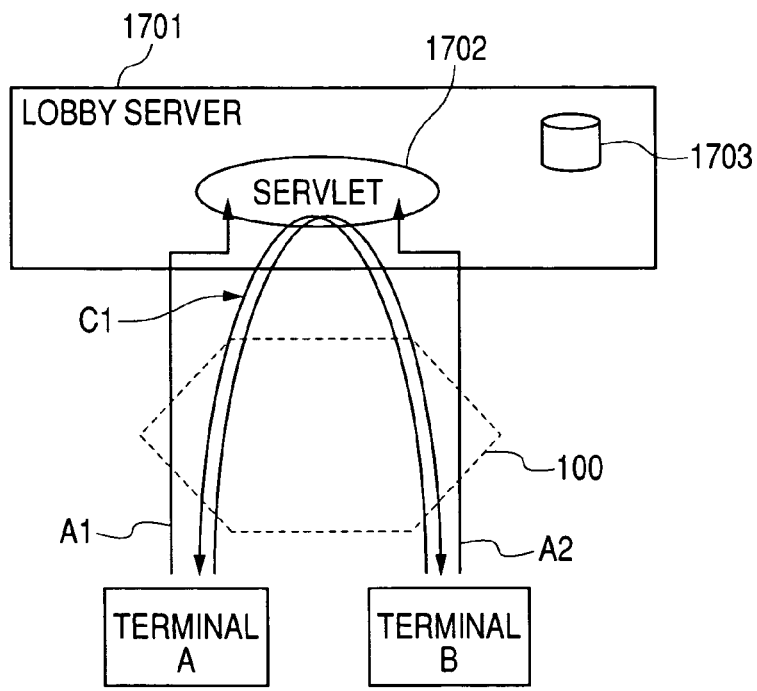

FIG. 18

```
POST/BrowserClass HTTP/1.1
Host: www.BrowsDenwaCorp.com
Content-Type: text/xml;charset=utf-8
Content-Length: length
SOAPAction: "BrowserRemoteClass"
<?xml version="1.0" encoding="utf-8"?>
<soap:Envelope xmlns:soap="http://schemas.xmlsoap.org/soap/envelope/">
 <soap:Body soap:encodingStyle="http://schemas.xmlsoap.org/soap/encoding/">
  <RemoteCmd>
   <BrowsPosition>100</BrowsPosition>
  </RemoteCmd>
 </soap:Body>
</soap:Envelope>
```

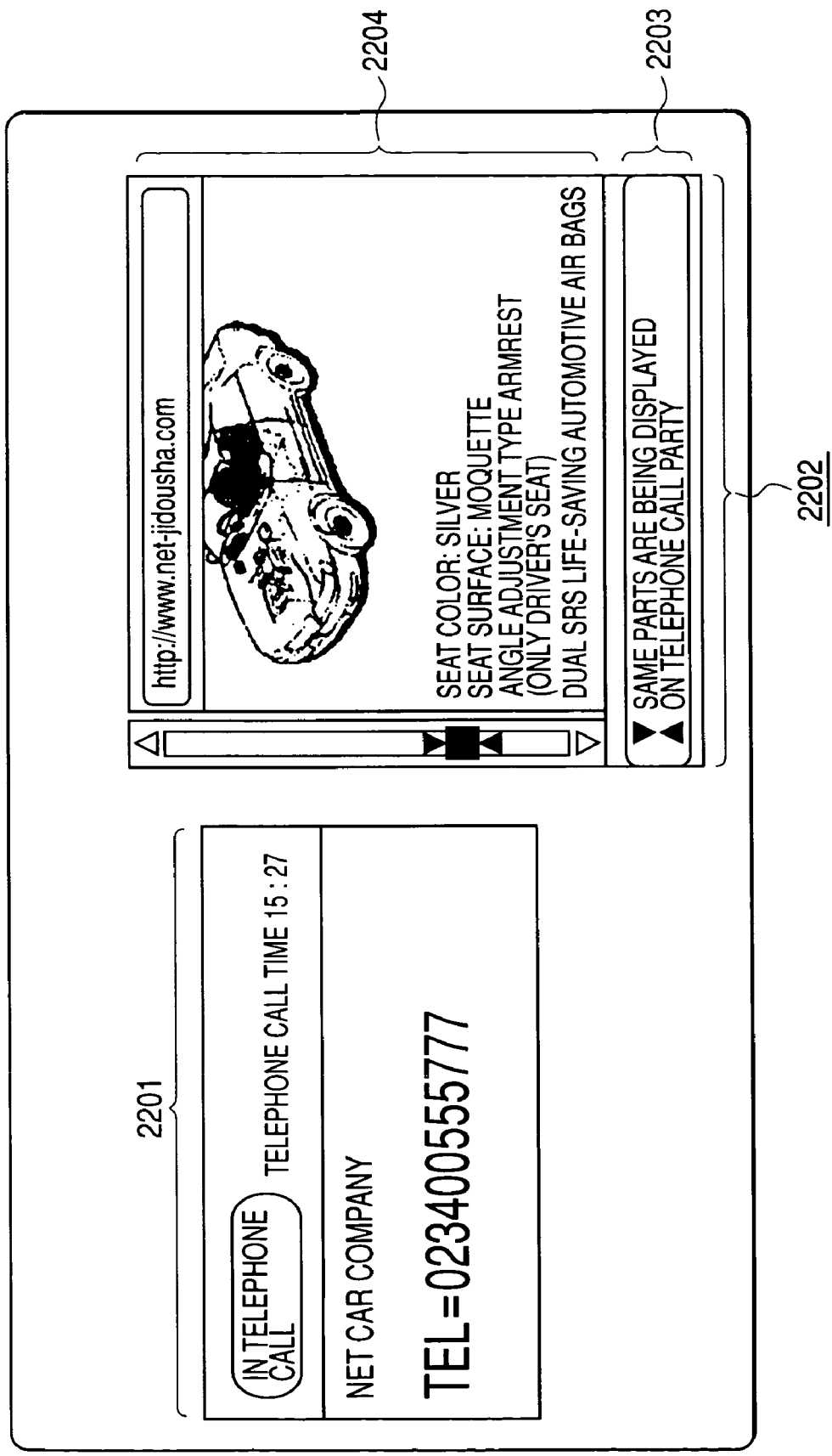

FIG. 23

```
POST/BrowserClass HTTP/1.1
Host: www.BrowsDenwaCorp.com
Content-Type: text/xml;charset=utf-8
Content-Length: length
SOAPAction: "BrowserRemoteClass"
<?xml version="1.0" encoding="utf-8"?>
<soap:Envelope xmlns:soap="http://schemas.xmlsoap.org/soap/envelope/">
<soap:Body soap:encodingStyle="http://schemas.xmlsoap.org/soap/encoding/">
<RemoteCmd>
<BrowsPixel>200,200</BrowsPixel>
</RemoteCmd>
</soap:Body>
</soap:Envelope>
```

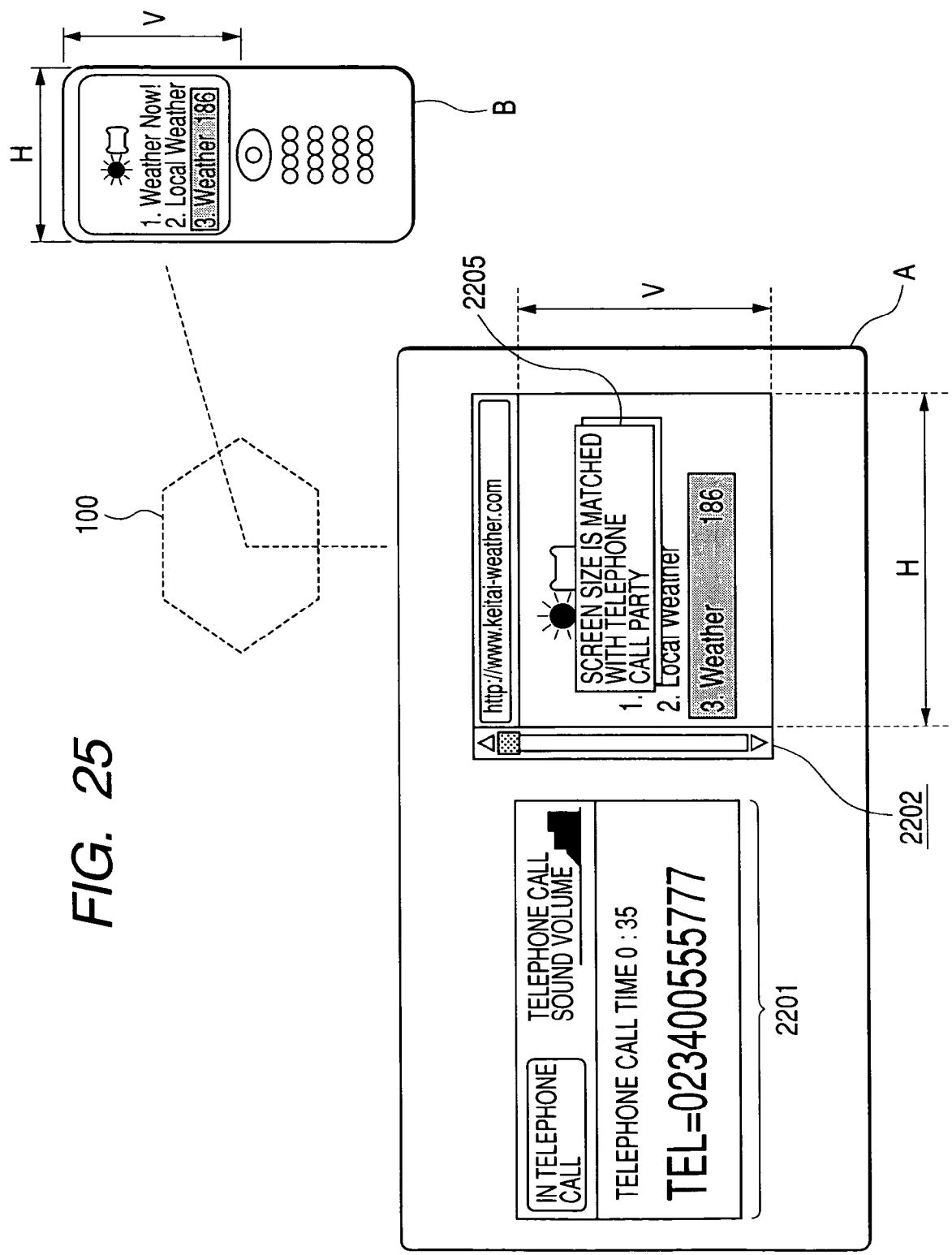

COMMUNICATION TERMINAL, CONTROL METHOD OF COMMUNICATION TERMINAL, AND CONTROL PROGRAM OF COMMUNICATION TERMINAL

This application claims priority from Japanese Patent Application No. 2003-186069 filed on Jun. 30, 2003, which is hereby incorporated by reference.

BACKGROUND OF THE INVENTION

1. Field of the Invention

The present invention relates to a communication terminal which is connected to an IP (Internet Protocol) network and thus performs telephone call by a predetermined IP telephone method, a control method for the communication terminal, and a control program for the communication terminal.

2. Related Background Art

In recent years, the Internet becomes worldwide rapidly. In such a situation, because the Internet has an advantage of remarkably decreasing communication charges, an Internet telephone (hereinafter called an IP telephone) which uses the Internet gets a lot of attention. Here, in the IP telephone, a particularly dominant standard at present is a VoIP (Voice over Internet Protocol) based on ITU-T (International Telecommunication Union-Telecommunication Standardization Sector) Recommendation H.323 or the like, and various types of devices corresponding to the IP telephone based on such a standard are proposed.

Conventionally, a device structure for browsing various contents (a Web page, an FTP/GOPHER (File Transfer Protocol/Gopher) directory, a NetNews, etc.) on the Internet by using a personal computer is independent of a device structure for performing telephone call by using the IP telephone. However, in recent years, a device which is made by uniting these two kinds of devices is being achieved. Here, it should be noted, in the conventional device structure, the above various contents on the Internet are browsed by means of Web browser software in many cases in accordance with corresponding protocols such as an HTTP (HyperText Transport Protocol), an FTP (File Transfer Protocol), a Gopher protocol, an NNTP (Network News Transfer Protocol), and the like. Incidentally, the conventional device structure has advantages due to such unification. That is, for example, it is possible to browse net contents as performing telephone call, and it is also possible to make a call by simply designating telephone number information included in a net content. Here, it should be noted that such a function to browse the net content as performing the telephone call is remarkably different from a conventional telephone function, whereby it is expected that various services concerning this function develop in the future.

However, in the present circumstances, it is necessary for a user who uses the above united device to actively browse the net content. That is, because a user operation to use the telephone is different from a user operation to perform the net content browsing, there is a problem that the content browsing operation which is complicated as compared with the telephone call operation is appropriately necessary for the user in addition to the telephone call operation. Thus, in consideration of such a problem, it is demanded to improve usability of the above united device.

Incidentally, as to display control of a browser for browsing the net contents (mainly Web pages, etc.) among plural terminals, following techniques are known.

For example, Japanese Patent Application Laid-Open No. 11-306116 discloses that, in order to display the same Web page on two client terminals, a URL (Uniform Resource Locater) appropriately designated by a user of one client terminal is transmitted to the other client terminal, and the content corresponding to the URL in question is displayed by the browser. However, in that case, the user of one client terminal has to perform the operation for designating the URL which is intended to be displayed on the other client terminal. For this reason, as compared with a conventional method that a user notifies a communication party of a URL through voices and mails, a user load cannot be reduced too much in Japanese Patent Application Laid-Open No. 11-306116.

Likewise, Japanese Patent Application Laid-Open No. 2000-341341 discloses that, in order to display the same Web page on plural client terminals, the URL of the content of the Web page in question or the content itself is transmitted and received through a transmission network which is different from that used for the communication between these client terminals. However, such a structure is premised on a television telephone, whereby the structure itself is complicated and expensive because it uses the transmission network different from that used in television telephone communication. That is, Japanese Patent Application Laid-Open No. 2000-341341 cannot be directly used in voice communication such as IP telephone communication.

Moreover, Japanese Patent Application Laid-Open No. 2002-149640 discloses that the same Web page is displayed on two terminals, windows of these two terminals are displayed with a predetermined size, and the display positions of these windows are synchronously controlled. However, such a structure has following problems. That is, an anchor object called a "marker" is necessary in an HTML (Hyper Text Markup Language) document to synchronously control the display positions of the windows, a specific support server is necessary to support handling of the anchor object, and it is difficult to secure compatibility between the terminal and an application used in the terminal.

As described above, in IP telephone terminals, a technique which can easily and inexpensively display the same net content on the plural terminals under telephone call and perform synchronous control of net content display (scroll) positions and browser window sizes of these terminals as maintaining high compatibility for the terminals and application software of the terminals is not known.

For the meantime, because there is no technique in the IP telephone terminals by which the same net content is displayed on the plural terminals under the telephone call and the displays on the plural terminals are synchronously controlled, the telephone call and the browsing of the net content are all controlled manually in the existing circumstances. For example, when two terminal users who are performing telephone call wish to browse a net content of the same page, following complicated operations are necessary. That is, the terminal users inform of the net content mutually by voice telephone call each other, and then each terminal user handles his own terminal based on the obtained information to browse the target net content. Alternatively, one of the terminal users makes and transmits an electronic mail which includes the URL of the target net content to the other of the terminal users while these users are performing the voice telephone call, and then the terminal user who received the electronic mail browses the target net content by referring to the URL included in the received electronic mail.

Moreover, even when the same net content can be browsed after such a complicated procedure, there are various problems for the browsing operation afterward.

For example, when the two users perform the telephone call as browsing the same net content, the conversation cannot be performed smoothly if both the users cannot surely browse the same content. However, according to the conventional structure, because the browsing is manually controlled by the user, there is a fear that the one user is browsing the content although the other user has already scrolled the browser to see another content or jumped to another linked site.

Moreover, for example, in a sales telephone service that a sales person and a customer perform telephone call as they are browsing and watching the same net content, when plural kinds of sales items (i.e., commodities) and explanations thereof are displayed within the same content page at all once, if one of the content pages is scrolled, there is a fear that agreement of sale is made although the target item watched and recognized by the sales person is different from the target item watched and recognized by the customer. In such a case, serious damage and economic loss may occur according to the content of sales.

Therefore, it is desirable to provide a structure for performing control so that both the two terminal users who are performing the telephone call can surely browse the same Internet resource.

Moreover, even when the net content of the same page can be browsed after the above complicated procedure, because a screen size to be displayed for browsing on each terminal is dependent on the device itself of the terminal in question, following inconveniences occur. For example, there is a fear that the screens are displayed in different layouts on the respective terminals which are under the telephone call. Besides, there is a fear that, although the user on one terminal can see a portion within the page of the screen displayed on the one terminal, the user on the other terminal cannot see the same portion within the page of the screen displayed on the other terminal if this page is not scrolled.

Therefore, in order to perform the control so that both the terminal users who are performing the telephone call can surely browse the same Internet resource, it is necessary to ensure a mechanism which can prevent that a difference in the information content on the Internet resource to be transmitted to the respective terminal users occurs due to a difference in the display functions (i.e., display capability) of the terminals of these users.

SUMMARY OF THE INVENTION

The present invention has been made in order to solve such conventional problems as described above, and an object thereof is to easily and inexpensively enable communication terminals which can perform telephone call and browse Internet resources (particularly in communication terminals such as inexpensively provided IP telephone terminals) to display the same net content while these terminals are under telephone call and perform synchronous control of net content display (scroll) positions and browser window sizes in these terminals as maintaining high compatibility for the terminals and application software of the terminals, thereby causing both users of these communication terminals to be able to surely browse the same Internet resource.

BRIEF DESCRIPTION OF THE DRAWINGS

FIG. 17 is an explanatory diagram showing the communication (i.e., transmission/reception of authentication and command) between the terminal shown in FIG. 1 and the lobby server;

FIG. 18 is an explanatory diagram showing a command format to be transmitted/received in a peer-to-peer manner by the terminal shown in FIG. 1;

FIG. 22 is an explanatory diagram showing a screen display example on the terminal shown in FIG. 1;

FIG. 23 is an explanatory diagram showing a command format to be transmitted/received in a peer-to-peer manner by the terminal shown in FIG. 1;

FIG. 25 is an explanatory diagram showing a screen display example on the terminal shown in FIG. 1.

DETAILED DESCRIPTION OF THE PREFERRED EMBODIMENT

Hereinafter, the embodiment of the present invention will be explained in detail with reference to the attached drawings.

Incidentally, in the specification and the claims of the present application, it should be noted that a term "Internet" indicates an IP network and a term "Internet resource" indicates data (including a file, a directory list, etc.) and another resource which are accessible on the IP network through IP. In other words, in the specification and the claims of the present application, the "Internet" is merely equivalent to the IP network which includes, in addition to the widely used Internet, a so-called intranet being the closed network in a company and another organization, and the "Internet resource" indicates the data which can be accessed on these networks through IP. Although it is originally preferable to use a suitable superordinate term such as an "IP network resource" or the like, such a term is not popular at the present moment, whereby the above terms are defined here.

Figure 1:
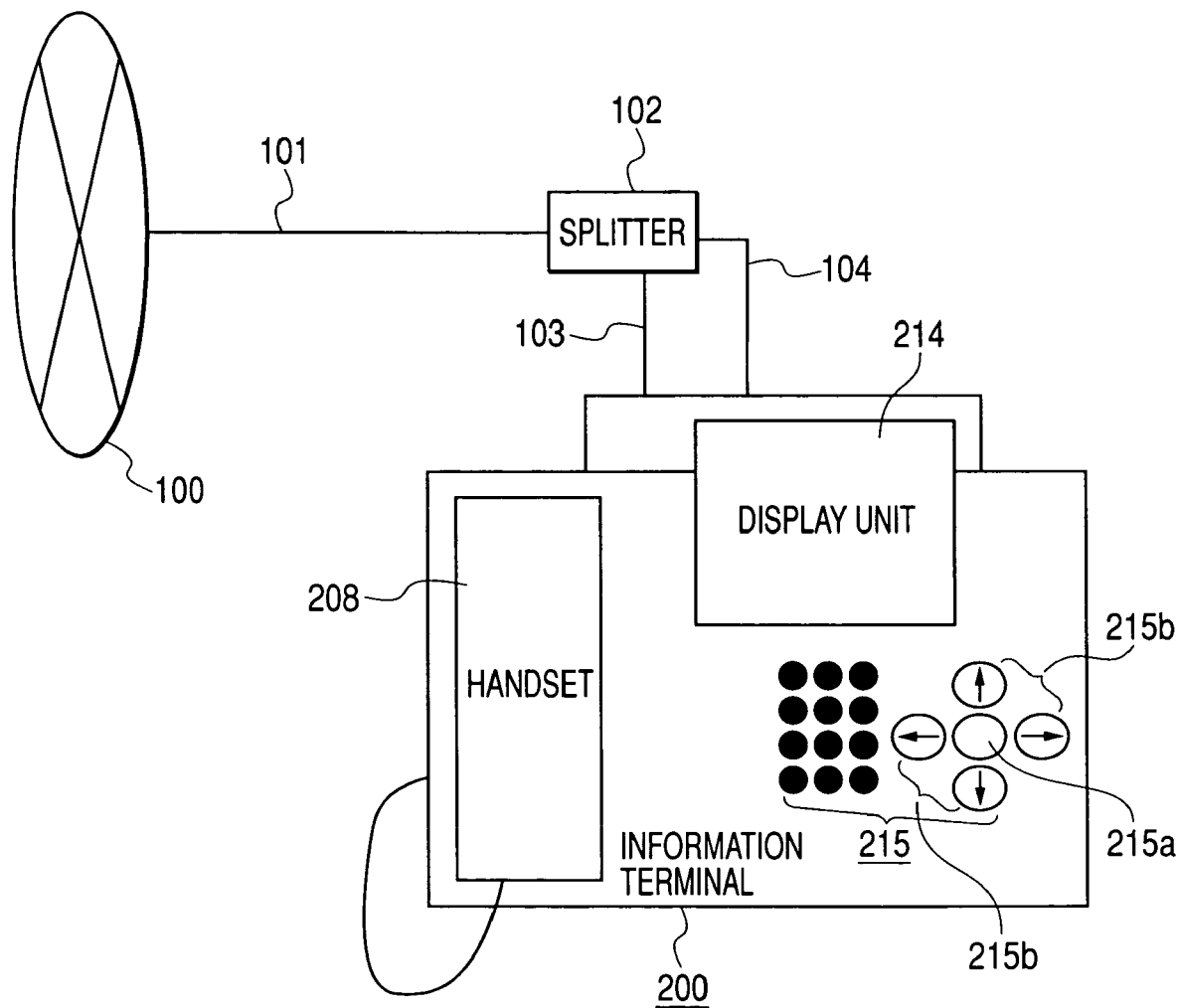
FIG. 1 is a block diagram showing the structure of a communication terminal which adopts the present invention.

FIG. 1 is a block diagram showing the structure of a communication terminal which has an IP telephone function and a Web browser function adopting the present invention. In FIG. 1, numeral 100 denotes an IP network to which an information terminal 200 is connected through a wire line 101. Here, it should be noted that the IP network 100 may include, in addition to the Internet, a closed network such as the intranet. However, in the following, the IP network indicates the Internet except a case which should be especially distinguished. In the present embodiment, it is assumed that the wire line 101 is an ADSL (Asymmetric Digital Subscriber Line), and, for the information terminal 200 shown in FIG. 1, the wire line 101 is split by a splitter 102 into a band line 104 for a PSTN (Public Switched Telephone Networks) and a band line 103 for an ADSL network.

The information terminal 200 can perform voice communication (telephone call, facsimile, and the like) when it is connected to the PSTN. On the other hand, the information terminal 200 can use various resources on the Internet (at least IP telephone communication, Web page browsing, electronic mail transmission/reception and the like in the present embodiment) when it is connected to the Internet (by using an ADSL connection system such as a PPPoE (Point-to-Point Protocol over Ethernet) or the like).

Here, it should be noted that, in addition to the ADSL, arbitrary line media such as an optical fiber line, a CATV (cable television) line, a wireless line and the like can be used to connect to the IP network 100.

The information terminal 200 shown in FIG. 1 consists of a display unit 214 such as an LCD (liquid crystal display) or the like, an operation unit 215 including a numeric keypad and various function keys, and a handset 208 to be used for voice telephone call. The display unit 214 and the operation unit 215 are used to control the telephone call and also to achieve the Web browser function.

The operation unit 215 which is composed of a keyboard, a pointing device, function keys and the like constitutes a user interface together with the display unit 214, and the user interface is used to accept Web browsing operations and operator's handling concerning printing, call generation, call reception, registration and the like and to notify a later-described CPU 201 of the operator's handling. For example, the operation keys provided on the operation unit 215 include dial keys for inputting a dial number, a URL, numerals "0" to "9", symbols "*", "#" and the like, alphabets, and the like, a transmission/reception key for controlling facsimile transmission/reception, an on-hook/off-hook key for controlling on/off states of lines, a hold key, a select key for setting various functions, and the like.

Moreover, a resource transfer button 215a and a scroll keys 215b are particularly provided on the operation unit 215. The resource transfer button 215a is depressed by a user to designate to share the Internet resource by the terminals which are respectively in mutual IP telephone call, and the scroll keys 215b are used to scroll a display screen of a later-described Web page and to select an appropriate item on a menu user interface or the like.

Figure 2:
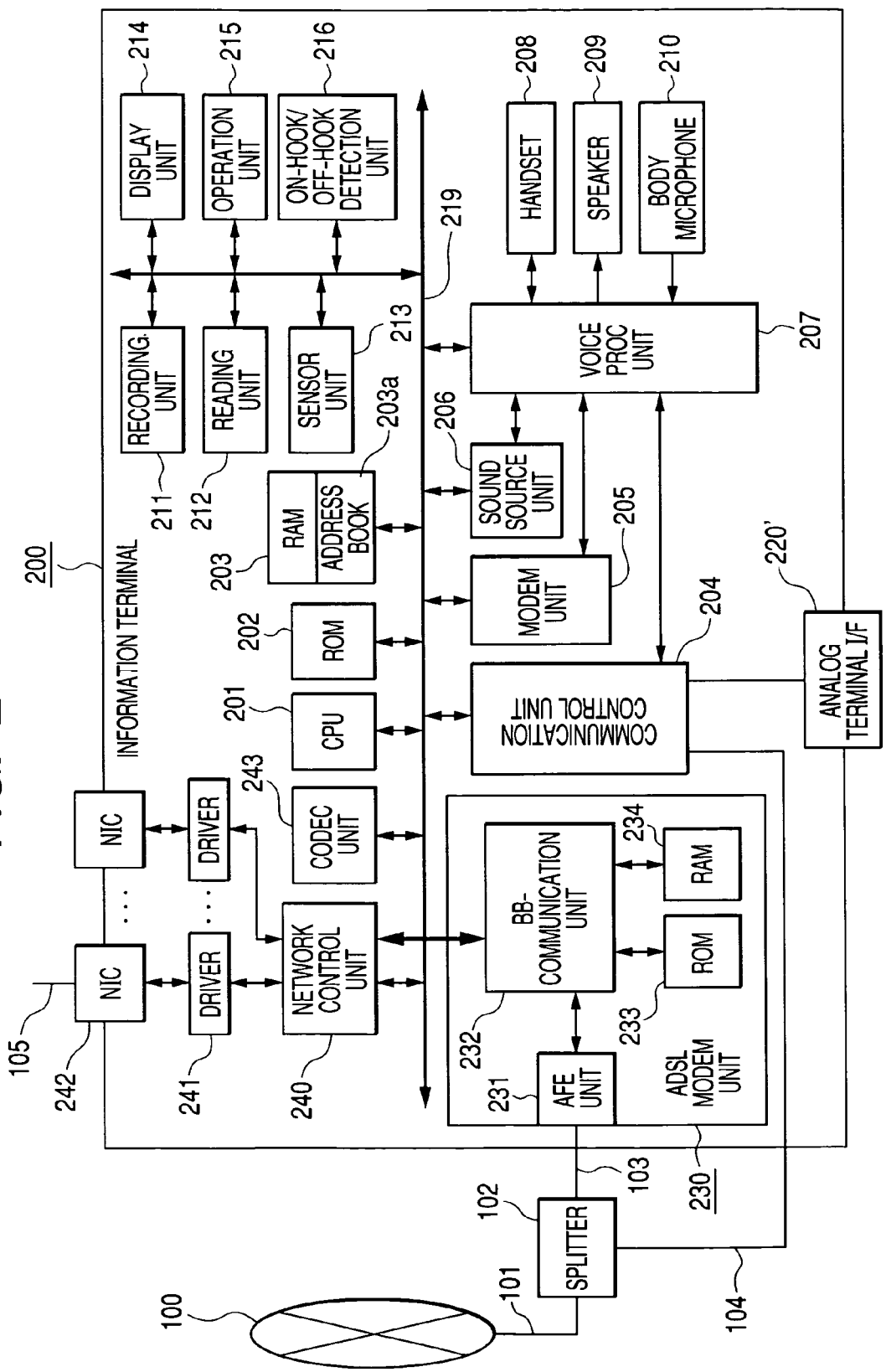
FIG. 2 is a block diagram showing the structure of a control system of the apparatus shown in FIG. 1.

FIG. 2 is a block diagram showing the structure of a control system of the information terminal 200 shown in FIG. 1. Here, it should be noted that the shown control system causes the information terminal 200 to achieve the IP telephone function, the Web browser function and a facsimile function (not shown in FIG. 1).

In FIG. 2, the CPU 201 receives input signals from various component parts through a data bus 219, and thus controls the component parts connected to the data bus 219 in response to the input signals. That is, the CPU 201 entirely controls the information terminal 200 in accordance with programs stored in a ROM 202. More specifically, the CPU 201 controls network connection and various protocols and further performs various processes. Of course, the control by the CPU 201 includes operation control, display control, reading control and recording control.

Moreover, the CPU 201 performs broadband connection control, IP telephone control, Web access control, Web page browsing control, IP address detection and extraction control, file creation for transmitting URL data or the like, and data transmission/reception control.

The ROM 202 which is made by a mask ROM, a flash ROM or the like is used to store various programs necessary for entire control by the CPU 201. Moreover, another flash ROM or EEPROM (Electronically Erasable and Programmable ROM) may be provided for data to be necessarily written and erased.

A RAM 203 is a working area to be used when the CPU 201 performs the processes. More specifically, the CPU 201 uses the RAM 203 when it performs Web browsing including a calling process, electronic mail transmission/reception, data reading, data recording, a voice codec data process, and the like. Unlike with the ROM 202, the RAM 203 stores temporary data.

Moreover, the RAM 203 includes the part which is backed up by a battery or the like, whereby time data, set contents of various service functions, and registered contents of an address book (or an telephone book) are stored in this part. In FIG. 2, an address book 203a is especially illustrated.

In the address book 203a, a telephone number obtained by number notification and the like in case of telephone call using an ordinary line (i.e., a later-described subscriber line), an IP address obtained in case of the IP telephone communication, a user name and its mail address corresponding to such selected information, a user name and its mail address of the own apparatus, and the like are stored on the basis of predetermined setting operations.

Moreover, an administration information storage area similar to the address book may be made as a nonvolatile memory by an EEPROM or the like.

Furthermore, the RAM 203 may also be used as a buffer for temporarily storing an IP address detected in an IP telephone connection procedure, a buffer for performing file transmission/reception, a reception buffer for displaying a Web page, and the like.

The communication control unit 204 is the interface which holds an analog PSTN (i.e., the band line 104 split by the splitter 102). Such an analog band line which is connected to a telephone line (hereinafter called a subscriber line) of a station switchboard consists of a polarity coincidence circuit which is a full wave rectification circuit made of diodes and used to coincide polarities of line voltages, a ringer detection circuit which is connected to the subscriber line of the station switchboard and detects a calling signal from the station switchboard, a pulse transmission circuit which forms a line loop and transmits a dial pulse to the station when an off-hook operation is performed, and a transformation circuit which performs two-wire/four-wire transformation. Moreover, because an analog terminal interface 220' to be connected to an external analog terminal is provided, an ordinary analog terminal can be connected to the information terminal 200 through the interface 220'.

A modem unit 205 which consists of a DSP (digital signal processor) and an AFE (analog front end) achieves a facsimile modem function to perform facsimile transmission/reception in a G3 type facsimile mode under the control of the CPU 201. Moreover, the modem unit 205 achieves a number display function to analyze modem data (number display data), an echo cancellation function to cancel an unnecessary echo, and a speakerphone function to operate a speakerphone.

A sound source unit 206 has a sound source data generation function to be able to reproduce a holding sound, a phone ringer melody and the like based on the data stored in the ROM 202 and the RAM 203 under the control of the CPU 201. The sound source unit 206 also functions as a sound source for outputting call progress tones such as a pseudo DT (dial tone), a BT (busy tone), an RBT (ring back tone), and the like.

A voice processing unit 207 performs a voice path control process of the signal from the modem unit 205, and input/output signals of the sound source unit 206, the handset 208, a speaker 209, a body microphone 210 and the communication control unit 204, and the like, under the control of the CPU 201.

The handset 208 (FIG. 1) is used to input/output voices generated in the telephone call on the ordinary line (subscriber line) and the IP telephone. An on-hook/off-hook detection unit 218 detects an on-hook/off-hook state of the handset 208, whereby a line on/off state is controlled based on the detected result of the on-hook/off-hook detection unit 218.

The speaker 209 is used to output a ringer tone and stored voice data, and is used as a monitor in speaker phone call. The body microphone 210 is used to input voice data when the speakerphone function is achieved.

A recording unit 211 is made of a known recording means such as a heat sensitive printer, a thermal transfer printer, a laser beam printer, an inkjet printer or the like. The recording unit 211 decodes MH (Modified Huffman), MR (Modified READ (Relative Element Address Designate)) and MMR (Modified Modified READ) encoded digital data and then records the decoded data in case of facsimile recording. Incidentally, in case of printing the data from the Web browser, the RAM 203 is used as a reception buffer. That is, the data of one page (Web page) described by a markup language (ordinarily an HTML (Hyper Text Markup Language)) is stored in the RAM 203, the stored data is converted into display data, and the converted data of a certain amount capable of being displayed on one screen of the display unit 214 is stored in a display buffer of the RAM 203. After the data storage in the display buffer ended, the Web browser notifies the recording unit 211 of a recording start (or a storage end).

When the storage end is notified, the recoding unit 211 reads the data from the display buffer, converts the read data into print data for each line, and then transfers the obtained print data to a recording means. After the data transfer ended, the recording unit 211 notifies the Web browser of a transfer end. After the transfer end was notified, if next display data exists, the Web browser stores the display data in the display buffer, and notifies the recording unit 211 of the storage end. After the data transfer corresponding to the Web page ended, if there no next display data, the Web browser notifies the recording unit 211 of a page end. That is, the data of one page is transferred to the recording unit 211 by repeating the above process, and then the Web page is printed.

A reading unit 212 which includes a known original reading means such as a CCD, a contact sensor array or the like converts analog data read by the original reading means into digital data, encodes the obtained digital data by a known encoding method such as an MH encoding method, an MR encoding method, an MMR encoding method or the like in facsimile communication, and then outputs the encoded data.

A sensor unit 213 detects a transmission original on the reading unit 212 and its size, and notifies the CPU 201 of the detected result. Moreover, the sensor unit 213 detects a recording paper on the recording unit 211 and its size, and notifies the CPU 201 of the detected result.

The display unit 214 (FIG. 1) which is made of liquid crystal parts such as a color LCD, a monochrome LCD and the like is used to display various information. Here, the display by the display unit 214 includes a display of HTML information received from a server on the Internet, a display of time, a display of in-use line states, a display of an error, a monitor display of other operation states, a display of a character message key-input from the operation unit 215, a display of a received character message, a display of set contents of various service functions of the telephone, and the like.

The operation unit 215 (FIG. 1) which consists of the keyboard (and the pointing device such as a mouse or the like), the numeric keypad and the various function keys constitutes the user interface together with the display unit 214. Moreover, the operation unit 215 accepts the Web browsing operations, and the operator's handling concerning the printing, the call generation, the call reception, the registration and the like, and then notifies the CPU 201 of the contents of the operator's handling.

A network control unit 240 controls various protocols concerning the Internet communication. Here, it should be noted that the network control unit 240 is shown as a circuit block in FIG. 2 for the sake of convenience. However, in practice, the function of the network control unit 240 is achieved by means of software.

The network control unit 240 controls input/output of an NIC (network interface card) 242 through a driver 241 (typically called a PHY (physical layer)) using an MII interface, and also controls input/output of an ADSL modem unit 230. Here, it should be noted that the plural NIC's 242 may be provided as shown in FIG. 2.

The NIC 242 which can use a CSMA/CD (Carrier Sense Multiple Access with Collision Detection) interface (i.e., Ethernet™) or an another-system interface is connected to the data bus 219 through the driver 241. Although the NIC 242 is used to communicate with another device connected to a LAN 105, it is not necessarily indispensable for later-described control. Moreover, the plural NIC's 242 are provided to connect to the LAN which belongs to a different IP address segment as shown in FIG. 2, and the number thereof may be arbitrarily determined. Of course, nothing but one NIC 242 is acceptable to achieve the object of the present invention.

In the network communication, data input and output among the circuits based on the network control unit 240 shown in FIG. 2 are performed as follows.

The IP telephone communication is performed according to, e.g., the VoIP based on ITU-T Recommendation H.323. In the VoIP, various kinds of protocols such as an IP (Internet Protocol), a UDP (User Datagram Protocol), an RTP (Transport Protocol for Real-Time Application), an RSVP (Resource Reservation Protocol) and the like can be used.

In the IP telephone, a voice signal input from the handset 208 is processed by the voice processing unit 207, the processed signal is further subjected to a codec process for a voice process by a codec unit 243, and the obtained signal is then encoded/decoded according to an encoding format based on ITU-T Recommendation G.711, G.729 or the like, whereby the voice signal is transmitted/received as digital data. Moreover, to specify an IP address of a telephone call party, a protocol such as an SIP (Session Initiation Protocol), ITU-T Recommendation T.323, an MGCP (Media Gateway Control Protocol) or the like is used.

In the present embodiment, the information terminal 200 communicates with the Internet and also communicates with the LAN 105 through the NIC 242, that is, a packet is forwarded between different network segments. For this reason, it is desirable for the network control unit 240 to have a router function for transferring the packet between the different network segments, and an NAT (Network Address Translator) function for transforming address and port numbers.

More specifically, the NAT function is the function for mutually transforming a private IP address and an original global IP address usable to access the Internet so that a node to which only a local IP address is allocated can secondarily access the Internet.

Moreover, because the information terminal is the apparatus which is connected to the LAN, a DHCP (Dynamic Host Configuration Protocol) is used to dynamically allocate the IP address when the terminal starts the operation and withdraw the IP address when the terminal ends the operation.

When the ADSL modem unit 230 is connected to the ADSL network, a protocol such as the PPPoE or the like is used. Moreover, when authentication is performed in the case where the ADSL modem unit 230 is connected to the ADSL network, a protocol such as a PAP/CHAP (Password Authentication Protocol/Challenge Handshake Authentication Protocol) or the like is used, whereby it is necessity to actually prepare such an authentication protocol in the network control unit 240.

Incidentally, the network control unit 240 and the ADSL modem unit 230 are mutually connected through an interface such as a UTOPIA (Universal Test and Operation Physical Interface for ATM (asynchronous transfer mode)).

The ADSL modem unit 230 is the communication control unit for achieving the Internet connection through the ADSL, whereby the public line (i.e., the band line 103 for the ADSL network) split by the splitter 102 is connected to the ADSL modem unit 230. The ADSL modem unit 230 consists of an AFE (analog front end) unit 231 and a BB-communication (broadband communication) unit 232. Moreover, the ADSL modem unit 230 includes a ROM 233 for storing programs of an ADSL modem and a RAM 234 for acting as a data working area.

Figure 3:
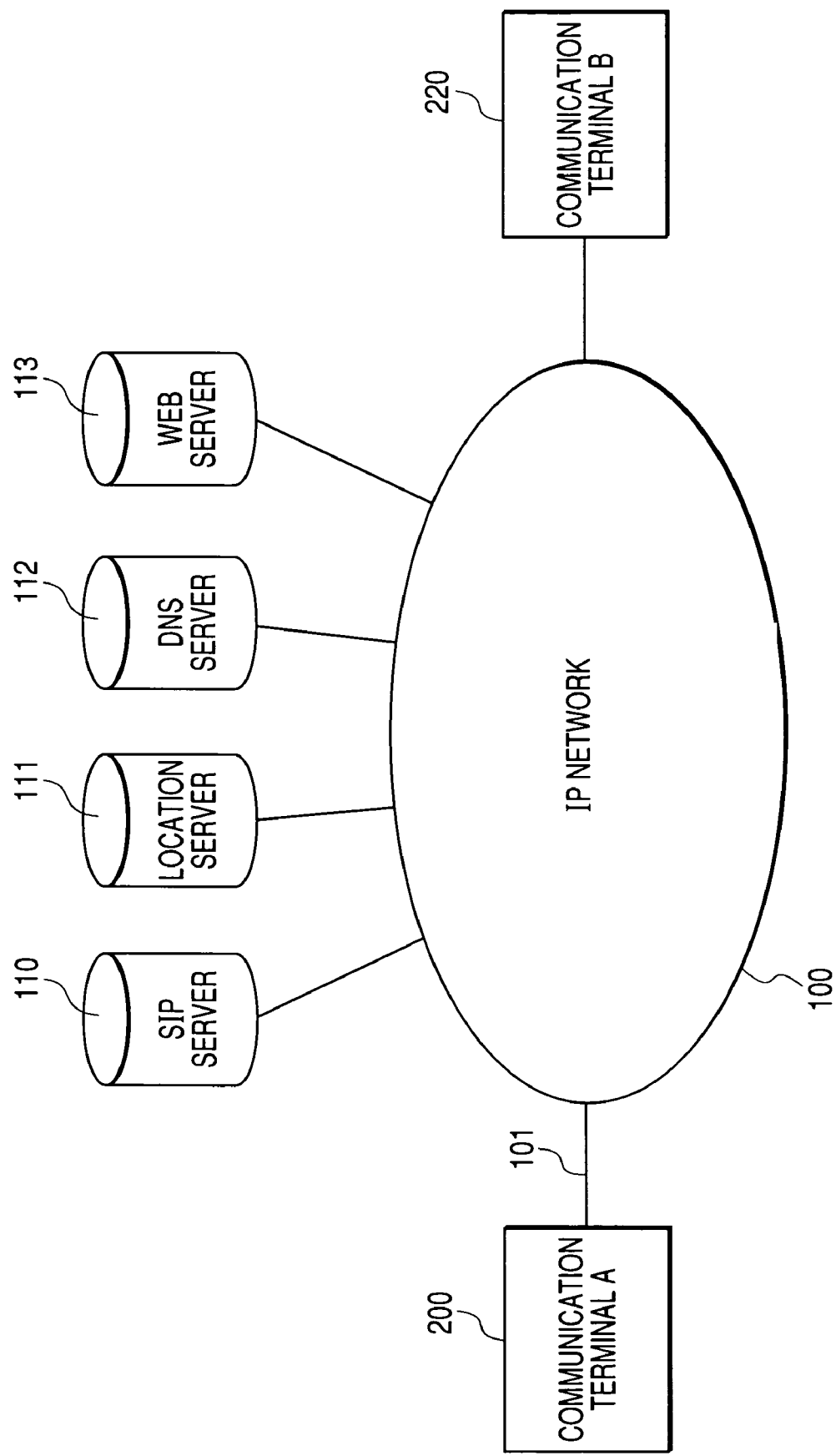
FIG. 3 is a block diagram for explaining a communication environment of an IP network through which the apparatus shown in FIG. 1 performs communication.

FIG. 3 is a block diagram for explaining a communication environment of the IP network. As shown in FIG. 3, the communication terminal 200 in the present embodiment is connected to the IP network 100 through the wire line 101 to communicate with a party communication terminal 220. That is, in FIG. 3, it is assumed that the communication terminal (A) 200 and the communication terminal (B) 220 are respectively connected to an identical ISP (Internet service provider).

On the IP network 100, an SIP server 110 used for connecting a call in the IP telephone, a location server 111 for administrating a telephone number/IP address correspondence table, a DNS (Domain Name System) server 112 for administrating a domain/host name correspondence table, and a Web server 113 are provided.

Figure 4:
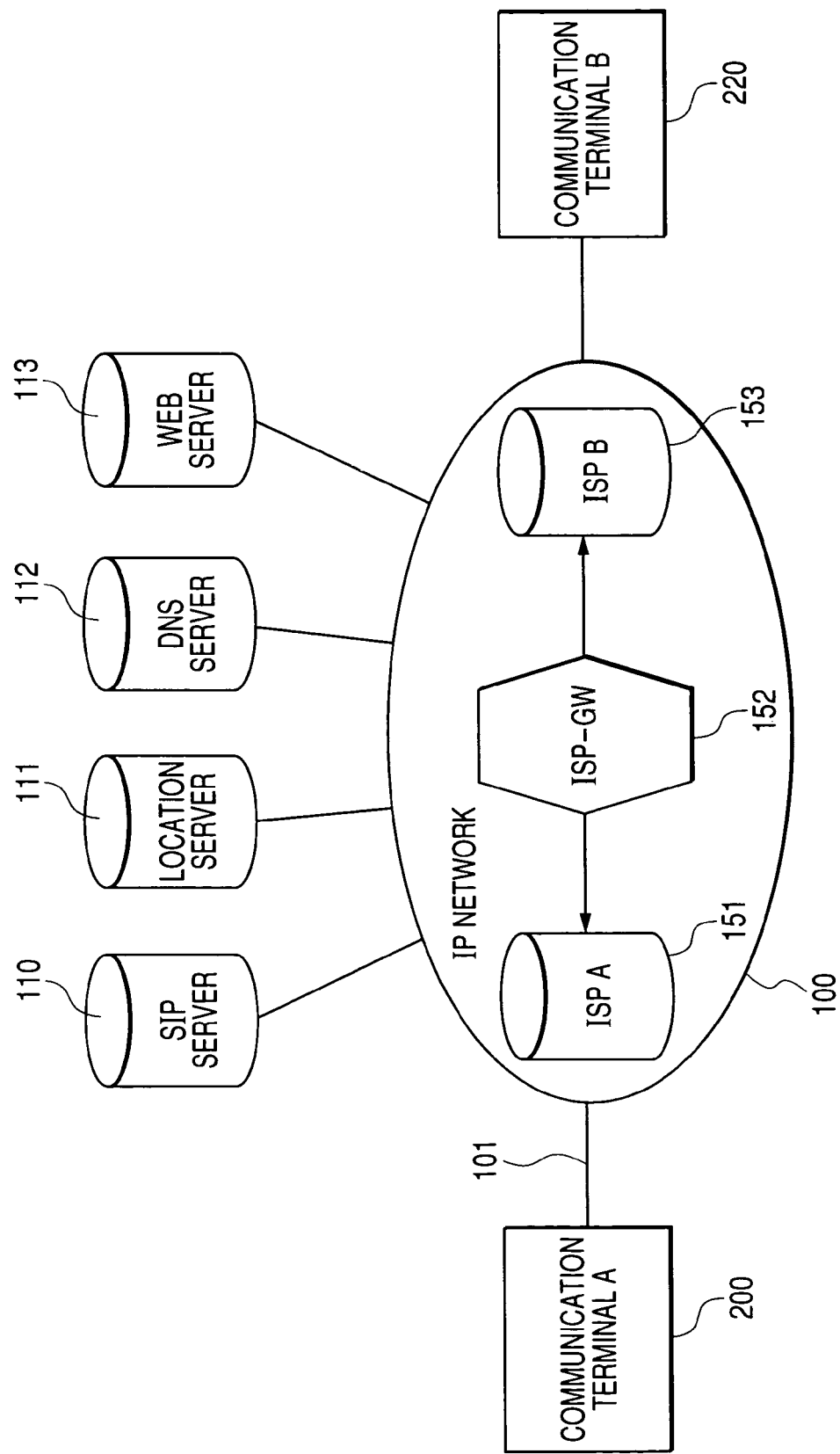
FIG. 4 is a block diagram for explaining another communication environment of the IP network through which the apparatus shown in FIG. 1 performs communication.
Figure 5:
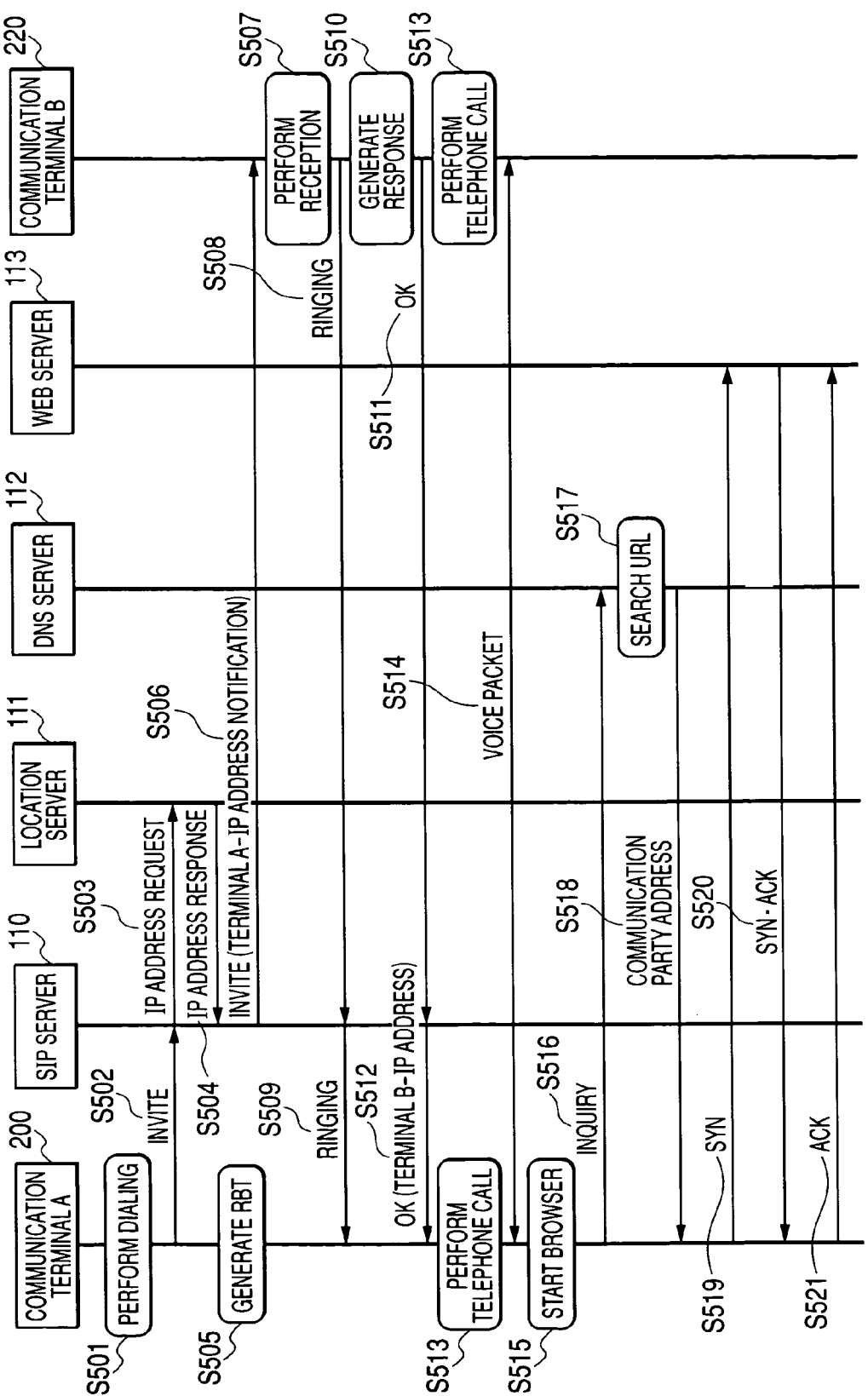
FIG. 5 is an explanatory diagram showing IP telephone communication by the apparatus shown in FIG. 1.
Figure 6:
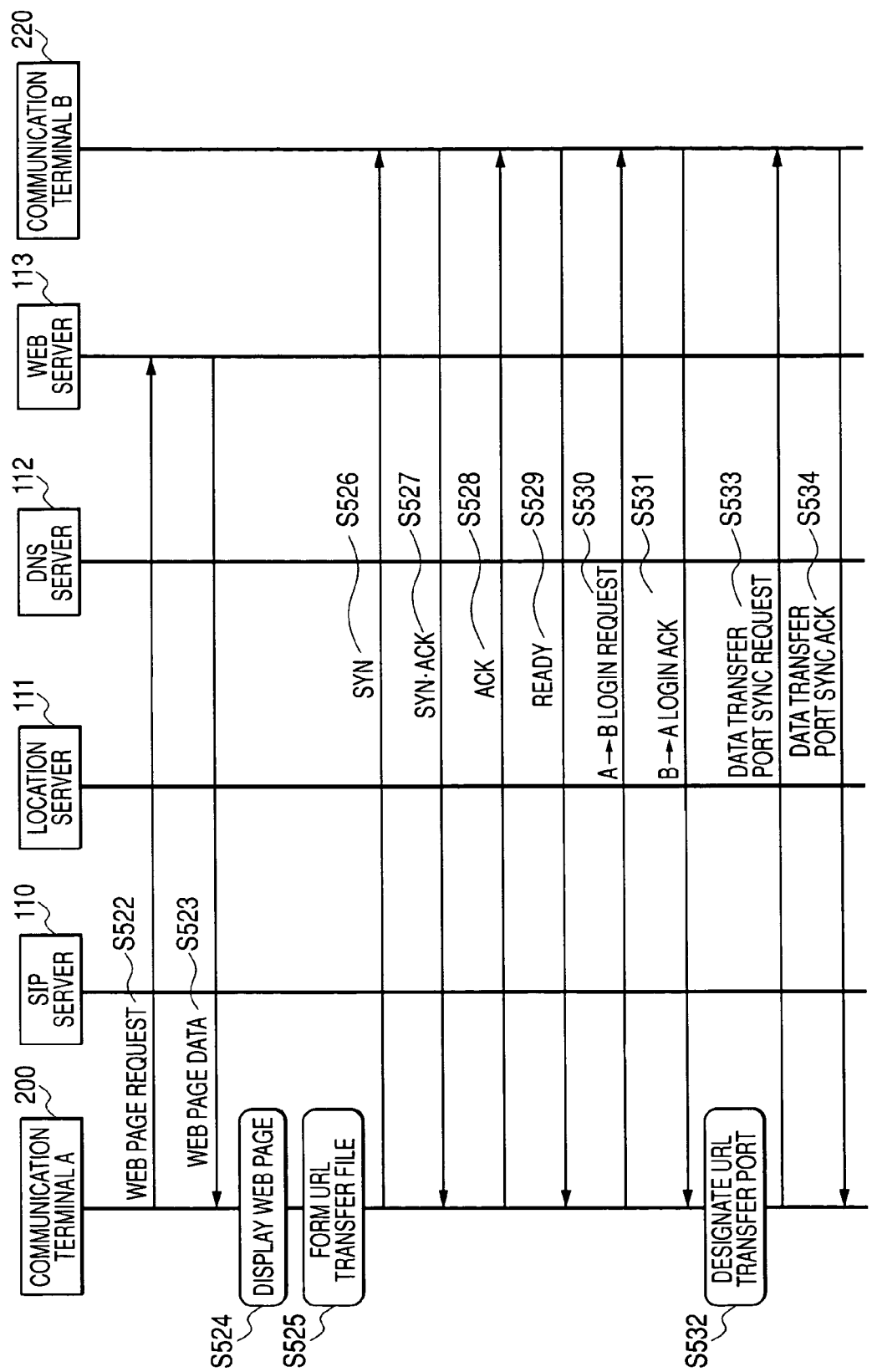
FIG. 6 is an explanatory diagram showing the IP telephone communication by the apparatus shown in FIG. 1.

Likewise, FIG. 4 shows a similar communication environment of the IP network. More specifically, FIG. 4 shows a state that, on the IP network 100, the communication terminal (A) 200 and the communication terminal (B) 220 are respectively connected through an ISP (A) 151 and an ISP (B) 153 which are different from each other. Here, it should be noted that either the Internet connection mode shown in FIG. 3 or FIG. 4 can be adopted according to a communication party. In FIG. 4, the communication terminal (A) 200 is connected through the ISP (A) 151 and the communication terminal (B) 220 is connected through the ISP (B) 153.

Moreover, in FIG. 4, an ISP-GW (Internet service provider gateway) 152 functions as a gateway between the different service providers, whereby the communication between the communication terminal (A) 200 and the communication terminal (B) 220 can be achieved. Here, it should be noted that the ISP-GW 152 may not be necessarily made by a single device, that is, the ISP-GW 152 may be made by plural gateway apparatuses.

An SIP system is used in the IP telephone communication according to the present embodiment. Here, it is assumed that the communication terminal 200 is the calling-side apparatus and the communication terminal 220 is the called-side apparatus. Thus, in the SIP system, the calling-side communication terminal 200 first transmits a calling message to the SIP server 110 to request to connect to the called-side communication terminal 220. Then, the SIP server 110 inquires of the location server 111 as to the IP address of the called-side communication terminal 220, whereby the IP connection between the communication terminals 200 and 220 is established by the obtained IP address.

Hereinafter, different communication control to share the Internet resource between the communication terminals which are in the telephone call by the IP telephone will be explained. Here, it is assumed that a net content (typically a Web page) capable of being displayed by the Web browser is used as the Internet resource to be shared by the communication terminals which are performing the mutual telephone call.

FIGS. 5 to 9 show a sequence of the IP telephone communication according to the present embodiment. In the IP telephone communication shown in FIGS. 5 to 9, a call connection is established from the communication terminal A to the communication terminal B each structured as shown in FIGS. 1 and 2, and the telephone call is then performed. Moreover, in the present embodiment, the Web page is browsed on the communication terminal A, and the URL data of the browsed Web page is transmitted from the communication terminal A to the communication terminal B during the IP telephone call, whereby the same Web information can be shared by both the communication terminals A and B.

Here, it should be noted that in FIGS. 5 to 9 the SIP server 110, the location server 111, the DNS server 112 and the Web server 133 are respectively the same as those shown in FIG. 3 or FIG. 4.

The communication sequence shown in FIGS. 5 to 9 is achieved by means of a communication control program to be executed by the CPU 201 shown in FIG. 1. Here, it should be noted that the communication control program for the CPU 201 is stored in, e.g., the ROM 202, and this is similar in another embodiment. Moreover, it should be noted that, in the communication sequence shown in FIGS. 5 to 9, the respective steps are shown by a step S501 and following steps. Furthermore, it is assumed that the ADSL connection has been already established and the communication terminals A and B have been already connected to the IP network.

In that case, the call connection is established from the communication terminal A to the communication terminal B, the Web page is browsed on the communication terminal A, the URL data of the browsed Web page is transmitted from the communication terminal A to the communication terminal B, and the connection operation to the Web page based on the received URL data is performed by the communication terminal B. A series of these operations will be first explained hereinafter.

Initially, a dialing operation is performed by a user on the operation unit 215 of the communication terminal A (step S501 in FIG. 5), whereby the communication terminal A is connected to the SIP server 110 by means of an INVITE message (step S502).

Then, the SIP server 110 requests the IP address to the location server 111 (step S503), the location server 111 searches the IP address corresponding to the designated telephone number and transmits the obtained IP address to the SIP server 110 (step S504). At that time, the RBT is generated by the communication terminal A (step S505).

Here, the SIP server 110 transmits the INVITE message (request) to the communication terminal B based on the received IP address of the telephone call party to request the connection (step S506). At that time, the communication terminal B obtains the IP address of the calling-side communication terminal A.

Then, the communication terminal B performs the reception operation in response to the INVITE request from the SIP server 110 (step S507), and returns a RINGING signal indicating an in-cal state (i.e., the state that the telephone call is being performed) to the SIP server 110 (step S508). Then, the SIP server 110 transmits the RINGING signal to the communication terminal A (step S509).

When the communication terminal B generates a response (step S510), OK information indicating the connection end is transmitted from the communication terminal B to the SIP server 110 (step S511). Then, the SIP server 110 transmits the OK information to the communication terminal A, whereby the communication terminal A likewise obtains the IP address of the called-side communication terminal B (step S512).

Subsequently, a voice packet can be transmitted and received through the IP connection established between the communication terminals A and B (step S513), and the communication terminals A and B come into the telephone call (step S514). Ordinarily, real-time capability is considered to be important in the communication based on the VoIP, whereby the above communication is performed based on the UDP. However, it is also possible to select the communication based on a TCP (Transmission Control Protocol).

Because the communication terminal A is being connected to the IP network, the resources on the Internet such as the Web page, the electronic mail transmission/reception, and the like can be used.

It is possible to sufficiently expect that the Internet resource such as a specific Web page or the like becomes a topic of conversation according to the progress of the telephone call between the communication terminals A and B. In such a case, as described above, the URL of the Web page is conventionally notified through the voice while the IP telephone is being performed. However, in the present embodiment, the URL of the Web page is transmitted from the communication terminal A to the communication terminal B, whereby the Web page in question can be browsed on the communication terminal B.

The communication terminal A starts the Web browser (step S515), the URL is input from the operation unit 215, the communication terminal A inquires of the DNS server 112 as to the address of the Web server 113 designated by a URL (step S516). Then, the DNS server 112 searches the address of the Web server 113 based on the URL (step S517), and returns the searched result to the communication terminal A (step S518).

The communication terminal A accesses the Web server 113 based on the IP address obtained form the DNS server 112. That is, the communication terminal A transmits a SYN packet to the Web server 113 (step S519), the Web server 113 transmits a SYN•ACK packet to the communication terminal A (step S520), and then the communication terminal A transmits an ACK packet to the Web server 113 (step S521).

When synchronization is established as above, the communication terminal A requests the Web page to the Web server 113 (step S522 in FIG. 6), and the Web server 113 transmits the Web page data to the communication terminal A (step S523). When the Web page data is received, the communication terminal A causes the Web browser to display the Web page in question (step S524).

The communication terminal A transfers the URL to cause the communication terminal B to display the same Web page as that displayed on the communication terminal A. When the user on the communication terminal A wishes the user on the communication terminal B to see the content of the Web page in question, the user on the communication terminal A depresses the resource transfer button 215*a* of the operation unit 215.

As above, the resource transfer button 215*a* is depressed to start the resource sharing in the present embodiment. However, for example, one or all of a tool bar on the display unit 214, an appropriate-named button such as a "URL transfer" button provided on a console prepared as one of windows of the Web browser, a pointing device, and the like may be used to start the resource sharing.

In the present embodiment, because the URL information is transmitted from the communication terminal A to the communication terminal B based on the FTP, a file on which the URL is described is formed (step S525). Here, it should be noted that such a file including the URL is described based on an SOAP (Simple Object Access Protocol: RFC3288) so as to enable the called side (reception side) to start the Web browser.

In the FTP, two kinds of connections, i.e., the connection for control and the connection for data (file) transfer, are used.

First, the communication terminal A synchronizes the own terminal with the communication terminal B of the control port on the basis of the IP address of the communication terminal B obtained from the location server 111. Then, the communication terminal A transmits the SYN packet to the communication terminal B (step S526), the communication terminal B transmits the SYN•ACK packet to the communication terminal A (step S527), and the communication terminal A transmits the ACK packet to the communication terminal B (step S528). Thus, the communication terminal B transmits a ready signal indicating that it is possible to start the FTP communication to the communication terminal A (step S529).

The communication terminal A logs in the communication terminal B (step S530), and the communication terminal B acknowledges the login by the communication terminal A (step S531).

Incidentally, the IP connection has been already established at the time of authentication of the FTP login, it may be enough in numerous cases if a so-called anonymous FTP system using "anonymous" as a user name and a mail address as a password is used. For example, considerable security can be secured even in case of the anonymous FTP system, if it is set to accept only the FTP login from the party which is in the telephone call in the IP telephone.

However, in the authentication sequence, it is thought to further improve the security by appropriately exchanging the information inherent in each of the communication terminals. For example, the address book 203a is provided in FIG. 2. Thus, in that case, the communication terminal A transmits the mail address, and the communication terminal B judges whether or not the mail address from the communication terminal A is the one already stored in the address book 203a. Then, it is judged that the mail address in question has been stored in the address book 203a of the communication terminal B, the communication terminal B may acknowledge the FTP login from the communication terminal A. Here, it should be noted that such an FTP login sequence can be automatically achieved without any user input. Moreover, as above, if the authentication is performed by using the address book, it is possible to inhibit the FTP login from many and unspecified parties without any complicated operations, whereby it is possible to achieve considerable security.

Figure 7:
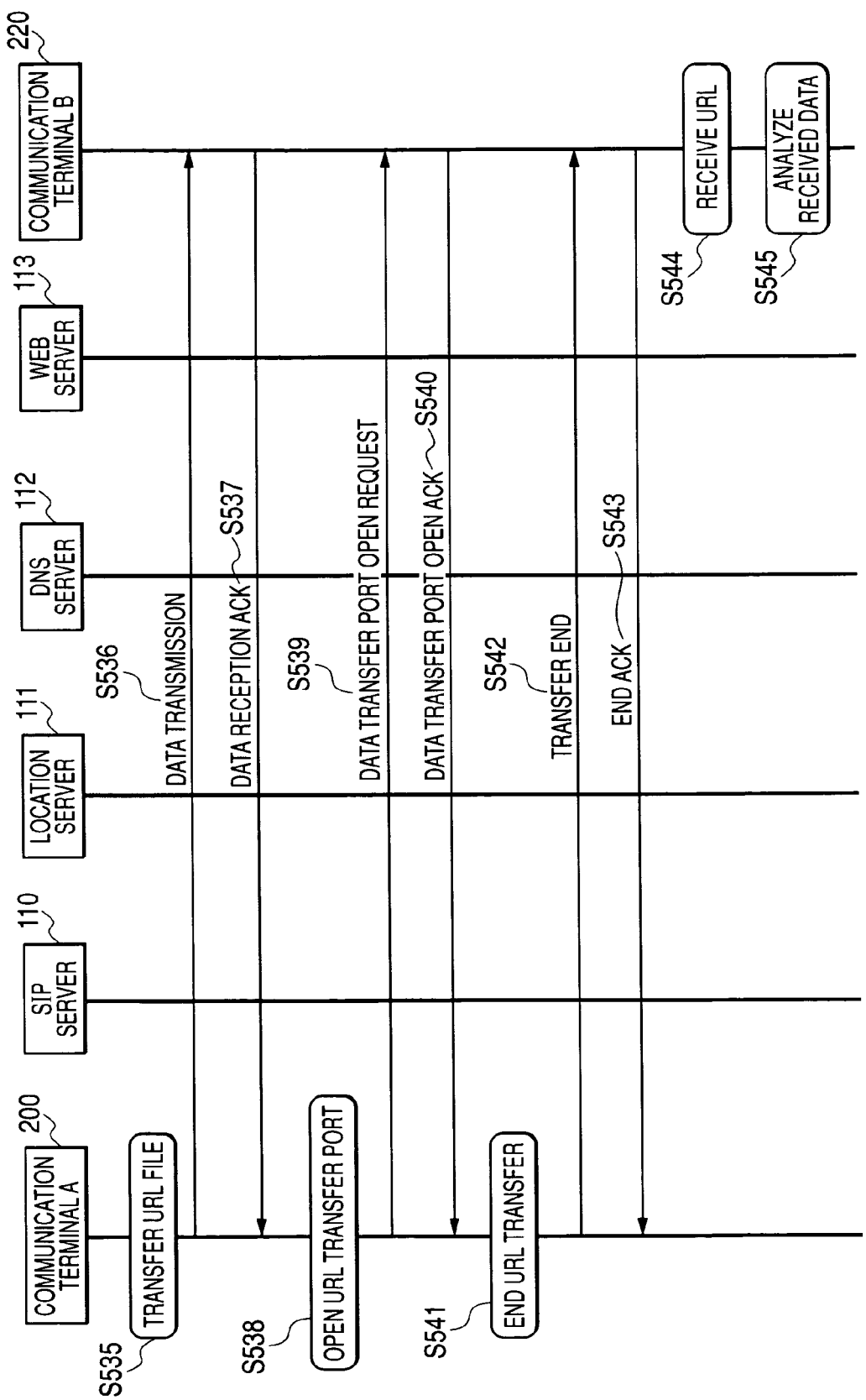
FIG. 7 is an explanatory diagram showing the IP telephone communication by the apparatus shown in FIG. 1.
Figure 8:
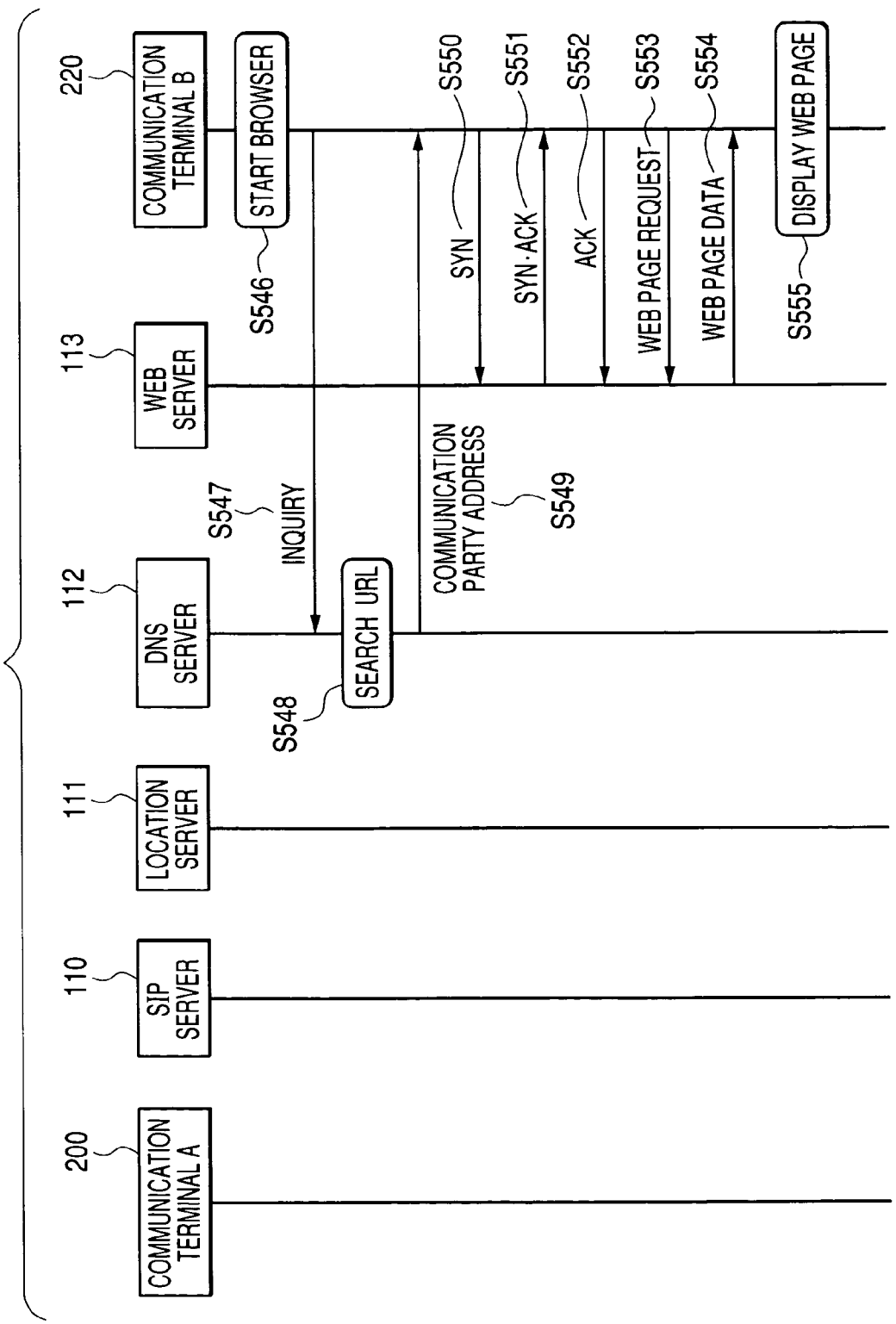
FIG. 8 is an explanatory diagram showing the IP telephone communication by the apparatus shown in FIG. 1.

Subsequently, the communication terminal A prepares the URL data transfer port in addition to the control port (step S532), and transfers the URL data to the communication terminal B through the prepared port (step S535 in FIG. 7). Here, the communication terminal A first synchronizes the URL data transfer port with the communication terminal B (steps S533 and S534), and then transmits the file with the URL described to the communication terminal B through the URL data transfer port (step S536). When the file is received, the communication terminal B returns an ACK to the URL data transfer port of the communication terminal A to notify the port of a reception end (step S537).

When the URL data transfer ends, the communication terminal A opens the URL data transfer port (step S538). That is, the communication terminal A transmits a port open request from the URL data transfer port to the communication terminal B (step S539), and the communication terminal B returns an ACK to the URL data transfer port of the communication terminal A (step S540). When the ACK is received, the communication terminal A ends opening of the URL data transfer port, and the URL data transfer ends (step S541). The communication terminal A notifies of the communication terminal B of the end of the FTP (step S542), and receives an ACK from the communication terminal B (step S543).

When the file described based on the SOAP is received (step S544), the communication terminal B analyzes the received URL data file (step S545). Because how to handle the received data file can be designated in the SOAP, the communication terminal B starts the Web browser according to the indication by the SOAP (step S546 in FIG. 8), and inputs the URL received from the communication terminal A to the Web browser. Then, the communication terminal B inquires of the DNS server 112 as to the address of the Web server 113 designated by the URL (step S547). The DNS server 112 in question searches the address of the Web server 113 (step S548), and returns the searched result to the communication terminal B (step S549).

The communication terminal B accesses the Web server 113 on the basis of the IP address obtained from the DNS server 112. More specifically, the communication terminal B transmits an SYN packet to the Web server 113 (step S550), receives an SYN•ACK packet from the Web server 113 (step S551), and transmits an ACK packet to the SYN of the party (step S552). When the synchronization is established, the communication terminal B requests the Web page to the Web server 113 (step S553) and obtains the Web page data from the Web server 113 (step S554). When the Web page data is received, the communication terminal B causes the Web browser to display the Web page (step S555).

After ending the browsing of the Web browser, the communication terminal A ends the Web browser (step S556 in FIG. 9), transmits a disconnection signal to the Web server 113 (step S557), and ends the Web browser (step S558). Similarly, after ending the browsing of the Web browser, the communication terminal B transmits a disconnection signal to the Web server 113, and ends the Web browser (steps S559, S560 and S561).

Figure 9:
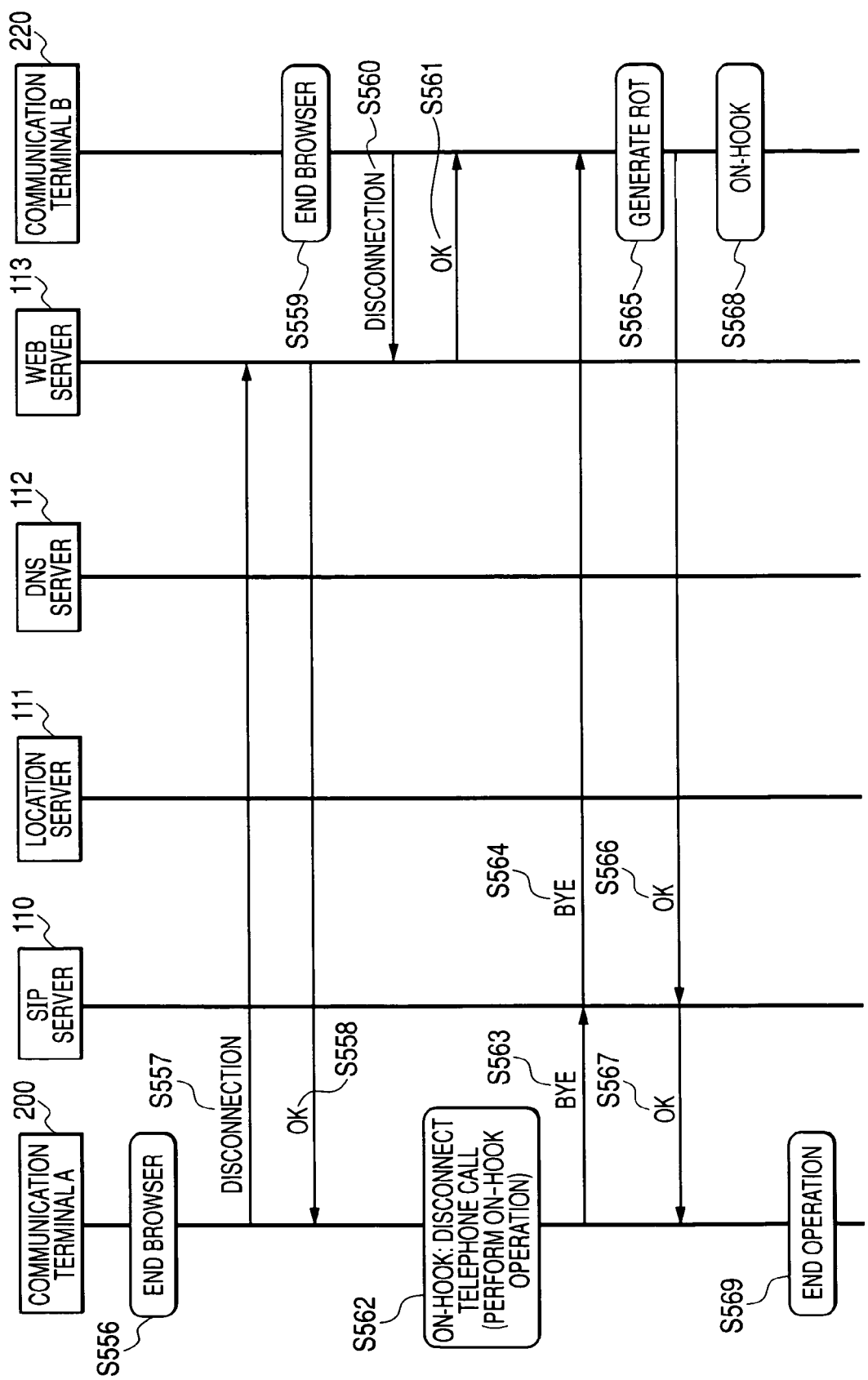
FIG. 9 is an explanatory diagram showing the IP telephone communication by the apparatus shown in FIG. 1.

In FIG. 9, the telephone call is ended by the side of the communication terminal A (step S562). More specifically, BYE and OK messages (signals) are exchanged through the SIP server 110 on the basis of VoIP and SIP procedures (steps S563, S564, S566 and S567), an ROT (reorder tone) is generated by the communication terminal B (step S565), an on-hook operation is performed (step S568), and then the telephone call sequence of the IP telephone ends (step S569).

Here, it should be noted that the URL data can be transmitted many times during the telephone call. For example, the URL data may be transmitted by depressing the resource transfer button 215a every time the Internet resource is changed on the communication terminal A (for example, the once-displayed Web page is redisplayed, or the browsing jumps to another Web page). Alternatively, the URL data may be automatically transmitted from the communication terminal A to the communication terminal B every time the Internet resource is changed on the communication terminal A (for example, the once-displayed Web page is redisplayed, or the browsing jumps to another Web page), until the telephone call ends (or another explicit operation is performed).

Figure 10:
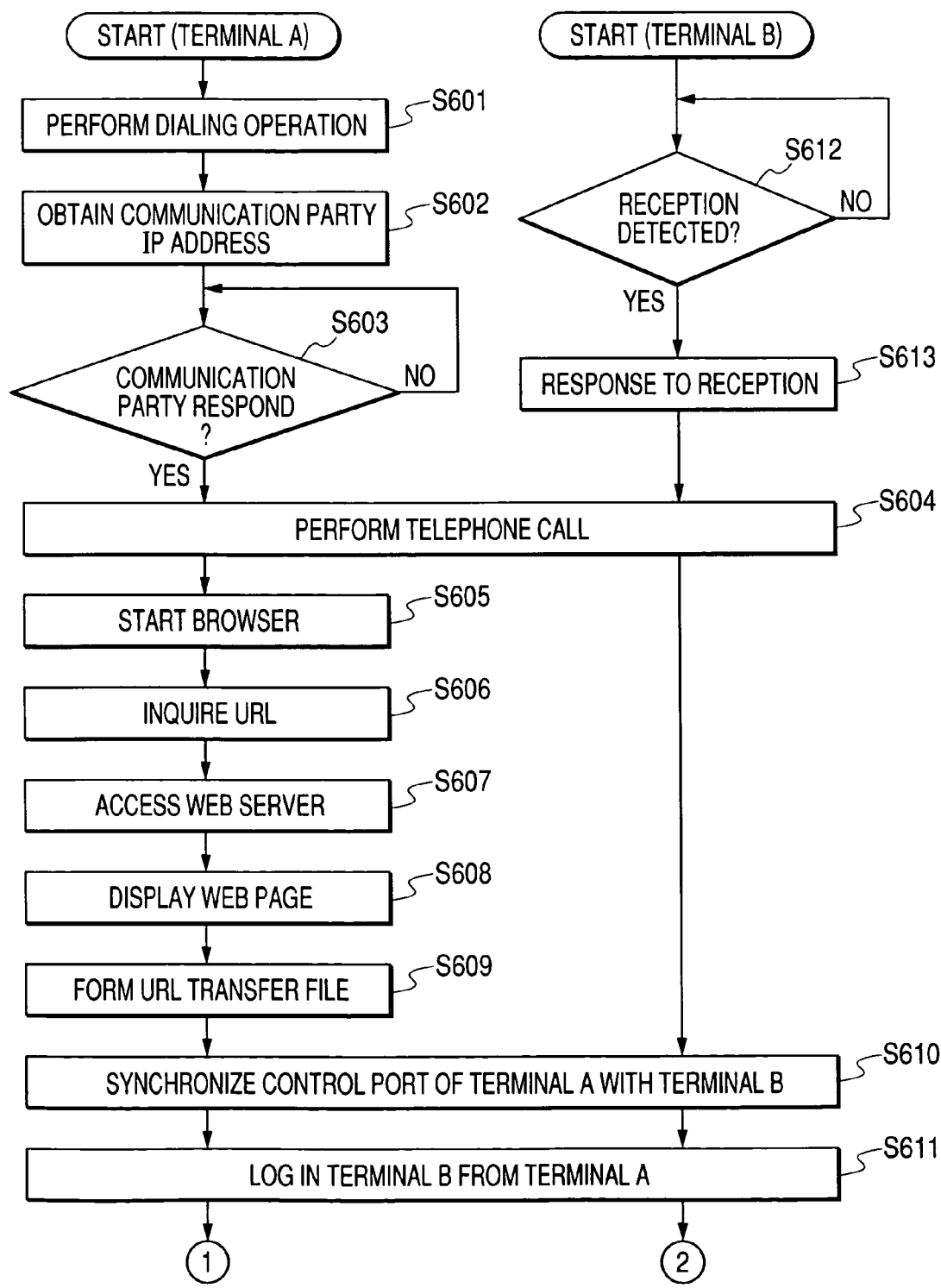
FIG. 10 is a flow chart showing a communication control procedure in the IP telephone communication by the apparatus shown in FIG. 1.
Figure 11:
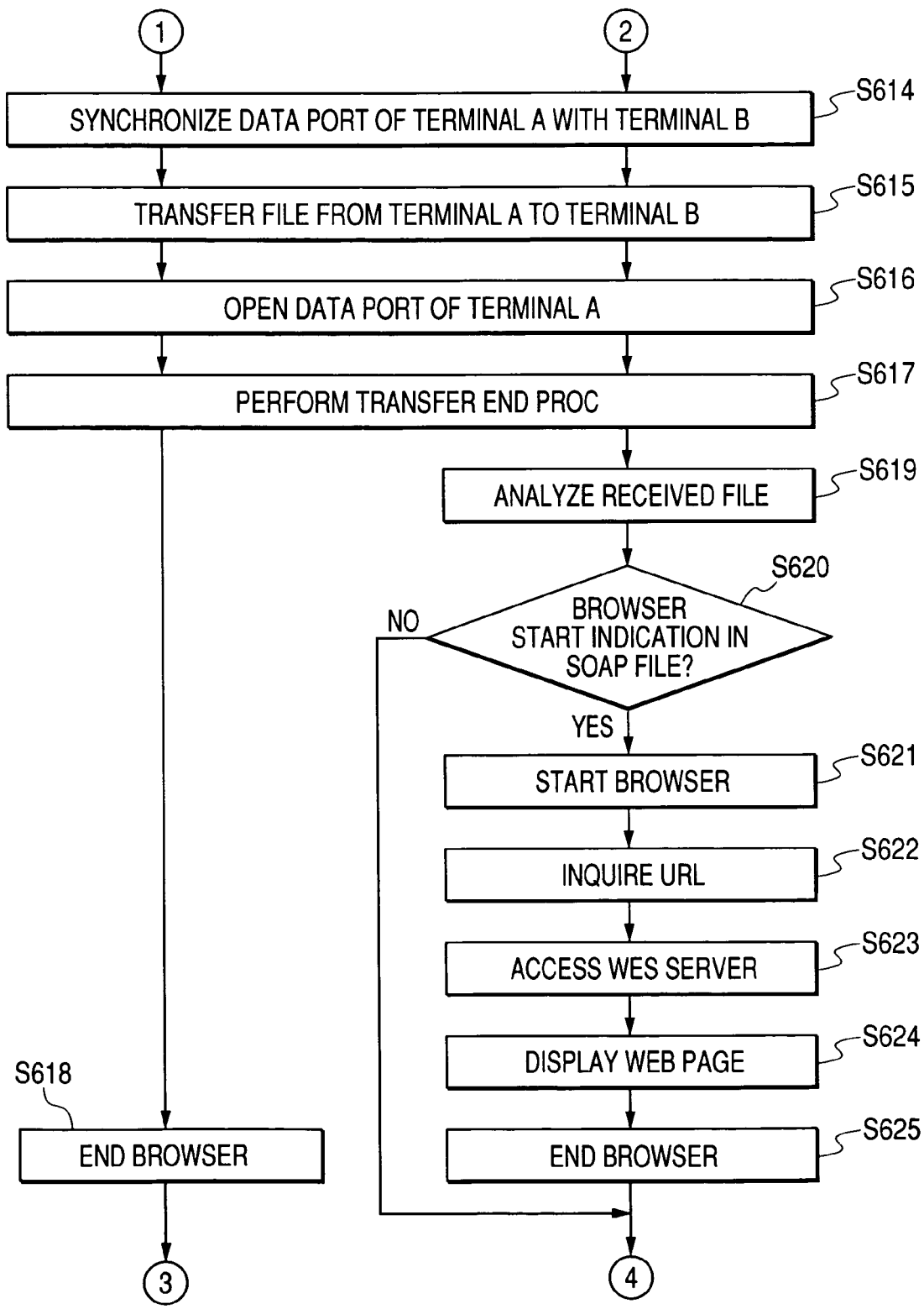
FIG. 11 is a flow chart showing the communication control procedure in the IP telephone communication by the apparatus shown in FIG. 1.
Figure 12:
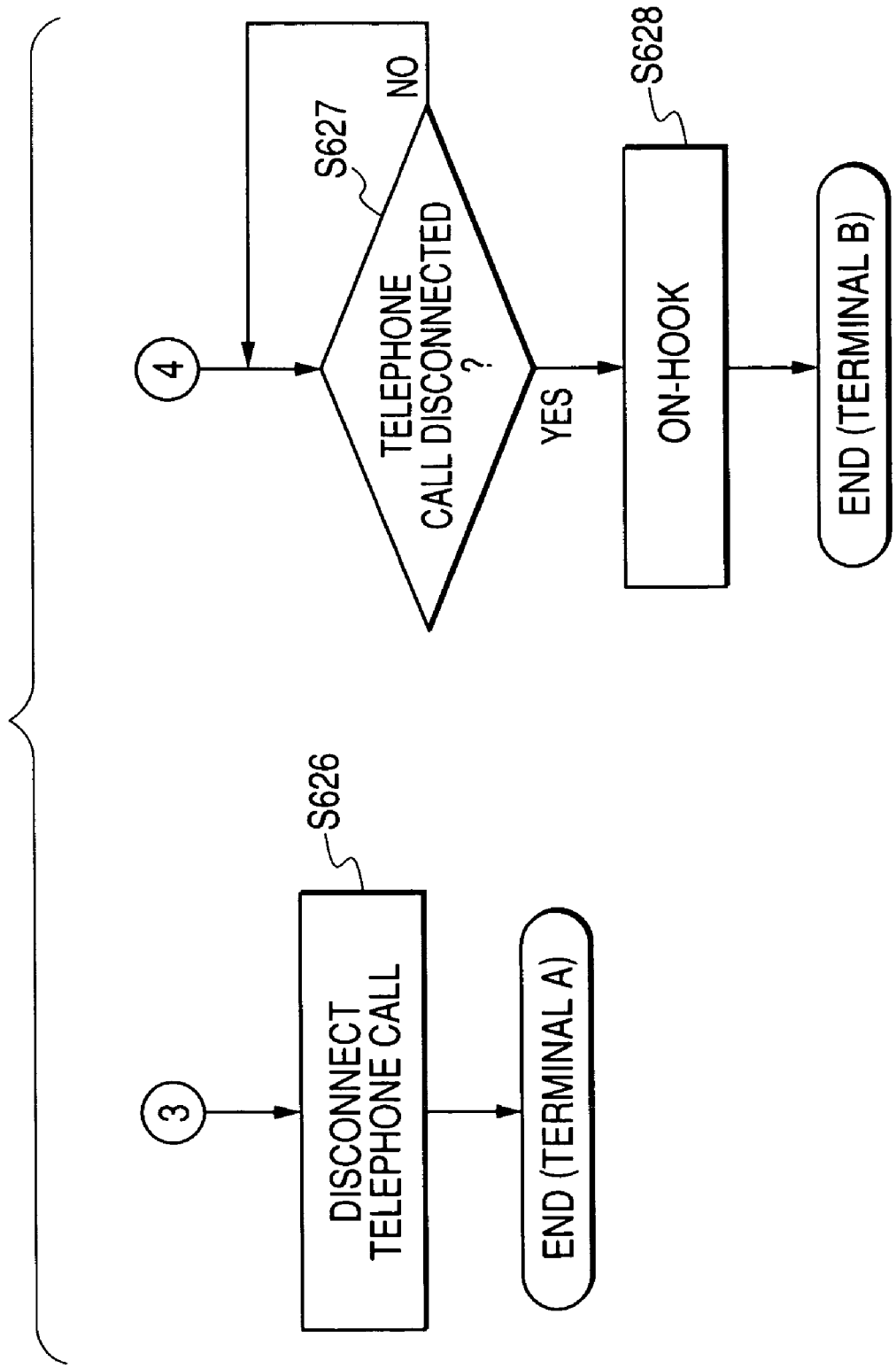
FIG. 12 is a flow chart showing the communication control procedure in the IP telephone communication by the apparatus shown in FIG. 1.

Next, an outline of the above IP telephone communication will be explained with reference to flow charts shown in FIGS. 10 to 12. Here, it should be noted that the procedure shown in FIGS. 10 to 12 corresponds to the communication sequence shown in FIGS. 5 to 9 and is achieved by executing the communication control program through means of the CPU 201 in FIG. 1. Moreover, it should be noted that the communication control program for the CPU 201 is stored in the ROM 202, and the respective steps in FIGS. 10 to 12 are shown by a step S601 and following steps.

Initially, the communication terminal A which performs notification makes a telephone call to the party terminal (i.e., the telephone call destination terminal). More specifically, the communication terminal A performs dialing to connect to the SIP server (step S601 in FIG. 10). Then, the SIP server calls the party terminal and also returns to the communication terminal A the IP address corresponding to the telephone number of the party terminal (step S602). Thus, the communication terminal A comes into a calling state, and then waits until the party terminal responds to the call (step S603). When the party terminal responds to the call, the communication terminal A and the party terminal come into a telephone call state (step S604).

Then, the communication terminal A starts the Web browser to display the Web page (step S605). That is, when the URL is input to the Web browser, the communication terminal A inquires of the DNS server as to the address of the Web server designated by the URL, and receives the searched result (step S606). Subsequently, the communication terminal A accesses the Web server on the basis of the IP address obtained from the DNS server, receives the data of the Web page (step S607), and causes the Web browser to display the Web page in question (step S608).

In order to cause the party terminal to display the same Web page as that displayed on the communication terminal A, the communication terminal A transfers the URL to the party terminal. First, the communication terminal A forms the file with the URL described to transfer the URL by using the FTP (step S609). Here, such a URL transfer file is described by the SOAP which is superordinate as compared with the FTP so that the Web browser can be started on the file reception side.

The communication terminal A synchronizes the terminal A itself with the party terminal of the control port on the basis of the IP address of the party terminal obtained from the location server (step S610), and logs in the party terminal when such synchronization with the party terminal can be obtained (step S611).

Subsequently, the communication terminal A prepares the URL data transfer port in addition to the control port, and synchronizes the URL data transfer port with the party terminal (step S614 in FIG. 11). Then, the communication terminal A transmits the file with the URL described to the party terminal through the URL data transfer port (step S615). When the URL data transfer ends, the communication terminal A opens the URL data transfer port (step S616). Then, the communication terminal A notifies of the party terminal of the end of the FTP, and performs a transfer end process (step S617).

When the browsing by the Web browser ends, the communication terminal A ends the Web browser (step S618). Moreover, when the telephone call with the party terminal ends, the communication terminal A disconnects the telephone call (step S626 in FIG. 12).

Next, the flow in a case where the URL of the Web page displayed on the party terminal is received and displayed while the telephone call by the IP telephone is being performed will be explained.

First, the communication terminal B which receives the notification monitors whether there is call reception in a standby state (step S612). When the call reception is detected, the communication terminal B responds to the call reception (step S613), and the communication terminal B and the party terminal come into the telephone call state (step S604).

The communication terminal B synchronizes the terminal B itself with the party terminal when the synchronization is requested from the party terminal (step S610). Then, the communication terminal B permits the login when the login is requested from the party terminal, and waits for the data transfer (step S611). Subsequently, the communication terminal B synchronizes the terminal B itself with the data transfer port of the party terminal (step S614), and receives the file with the URL described from the data transfer port of the party terminal (step S615).

When the URL data transfer ends, the communication terminal B opens the URL data transfer port of the party terminal (step S616). Then, the communication terminal B receives the notification concerning the end of the FTP from the party terminal, and performs a transfer end process (step S617).

When the file is received, the communication terminal B analyzes the received file (step S619). Then, when it is analyzed that the file has been described by the SOAP and the URL has been designated to start the Web browser (step S620), the Web browser is started to display the Web page (step S621). Subsequently, when the URL received from the party terminal is input to the Web browser, the communication terminal B inquires of the DNS server as to the address of the Web server designated by the URL, and receives the searched result (step S622). Then, the communication terminal B accesses the Web server on the basis of the IP address obtained from the DNS server, receives the data of the Web page (step S623), and causes the Web browser to display the Web page in question (step S624).

The communication terminal B ends the Web browser after finishing the browsing (step S625). Besides, the communication terminal B monitors the communication state between the terminal B itself and the party (step S627 in FIG. 12), and ends the telephone call when it is detected that the telephone call is disconnected by the party (step S628).

In the above, the example that the URL data is transmitted from the communication terminal A on the calling side to the communication terminal B is explained. However, it is of course possible to transmit the URL data from the communication terminal B to the communication terminal A in the same manner as above, so as to cause the communication terminal A to browse the Web page corresponding to the received URL data. Moreover, in the above, when the URL data is transmitted from the communication terminal A to the communication terminal B, the communication terminal A logs in the communication terminal B side. That is, the example that the communication terminal B side functions as the FTP server and the communication terminal A transmits the URL data (step S536 in FIG. 7, an FTP command such as an STOR (store) or an STOU (store unique) is used in that case) is explained. However, login direction and transmission/reception direction of the FTP in case of the URL data transmission are arbitrarily set (that is, whether to use the STOR or the STOU being the transmission command or use an RETR (retrieve) being a reception command), and these directions may be appropriately changed.

Incidentally, as above, it is possible to browse the same Internet resource by using the Web browser between the communication terminal A 200 and the communication terminal B 220.

Moreover, in the present embodiment, it is controlled to more surely synchronize the browsing of the same Internet resource, that is, it is controlled to ensure that the users who are in the telephone call can surely obtain the same information. To achieve this, in the present embodiment, it is controlled to synchronize the scrolling states of the Web browser browsing the same Internet resource between the communication terminal A 200 and the communication terminal B 220.

Figure 13:
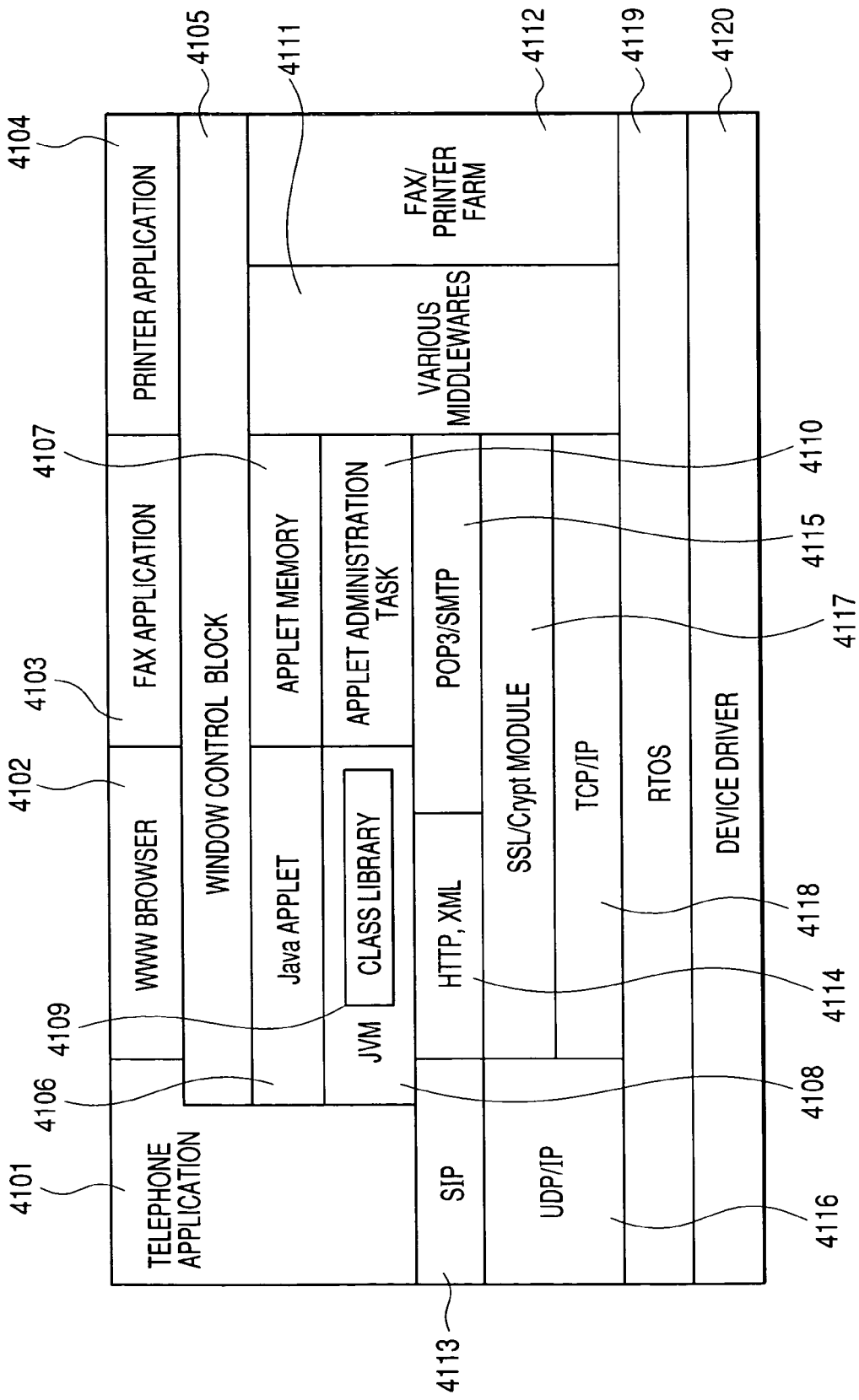
FIG. 13 is an explanatory diagram showing the configuration of a software block in the terminal shown in FIG. 1.

FIG. 13 shows an example of the software configuration necessary for the CPU 102 of the communication terminal A 200 and the communication terminal B 220.

The software blocks as shown in FIG. 13 are of course necessary for the various operations such as the facsimile communication, the image recording/outputting, the Web browsing and the like. Besides, the present embodiment adopts the structure for downloading a Java™ applet as a hardware-independent program object from a server on the Internet and executing it on the terminal side so as to synchronize the Web browser display states.

After the telephone call was started by the IP telephone, the same Web page is displayed on the communication terminals which are mutually communicating with each other. After then, the communication terminal A 200 and the communication terminal B 220 respectively download the Java™ applet from the server on the Internet and thus perform display control.

Incidentally, the configuration of the software blocks shown in FIG. 13 are as follows.

An RTOS (real-time OS) 4119 controls execution of each of software blocks 4101 to 4120 (task, memory areas, etc.) and administrates these software blocks. Besides, the RTOS

4119 controls communication in the respective tasks, and also controls access of each task to memories such as an applet storage area and the like.

A telephone application 4101 is the software block which is necessary for the IP telephone communication. Moreover, the telephone application 4101 controls superordinate layers of an SIP 4113 and a UDP/IP 4116, controls calling of the IP telephone, and further controls various applications concerning telephone such as telephone book search and the like.

A WWW (World Wide Web) browser (also called a Web browser) 4102 has a function to exchange the data with the indicated server on the basis of an HTTP (HyperText Transport Protocol), and a function to analyze HTML (Hyper Text Markup Language) data or XML (eXtensible Markup Language) data and thus display the server content based on the analyzed data. Moreover, the WWW browser 4102 has a function to download the applet from the Web page to the communication terminal.

A window control block 4105 performs control so that a superordinate application (e.g., an in-call display screen, a Web browsing display screen, a facsimile operation display screen, or the like) to be displayed on the communication terminal is displayed on the LCD of the terminal as an independent window. In the present embodiment, by the window control block 4105, the VoIP communication screen display application and the Web browsing screen display application can be executed as independent applications, and further the VoIP communication screen and the Web browsing screen can be simultaneously displayed respectively as independent windows.

An applet administration task 4110 administrates the applet. That is, the applet administration task 4110 downloads the applet and the like from a site designated through the Web browser, stores the downloaded applet in an applet memory 4107, starts the applet stored in the applet memory 4107 in response to requests from a user and another block, and deletes the applet from the applet memory 4107 if necessary. Here, it should be noted that such administration is not directly relative to the operation of the applet itself, that is, only the storage and start states of the applet in the memory are administrated.

The applet memory 4107 is the memory space for storing the applet, as above. The applet memory 4107 also stores other various data, and, by extracting a necessary part, acts as a working memory for executing the applet. In that case, a working memory use state is administrated by the applet administration task 4110, and the table itself of the working memory use state is disposed on the applet memory 4107.

When the user starts the operation, the applet is loaded onto a JVM (Java™ Virtual Machine) 4108, and the loaded applet is actually executed by using a previously prepared class library or the like. In the class library, various libraries of software interfaces capable of transmitting information with communication parties and servers in the form not dependent on terminal hardware and server communication means are provided.

Figure 14:
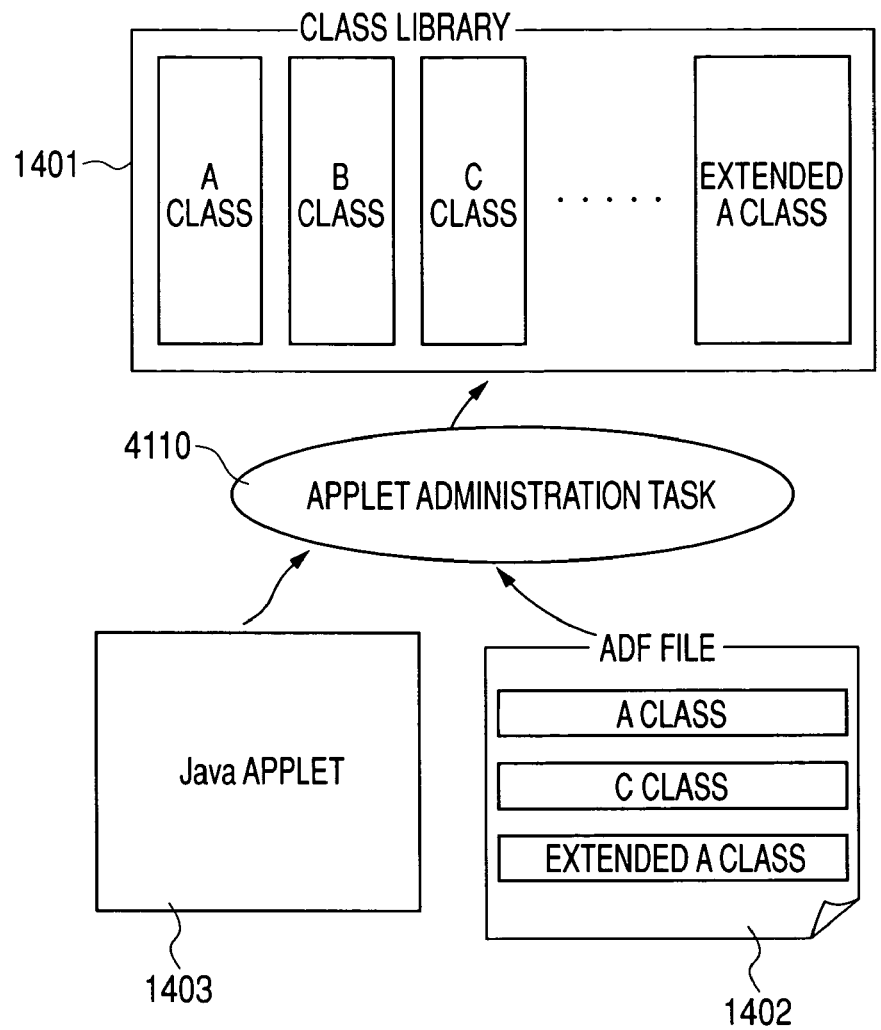
FIG. 14 is an explanatory diagram showing a Java™ execution environment in the terminal shown in FIG. 1.

FIG. 14 shows relation between the class library and the Java™ applet. A class library 1401 shown in FIG. 14 is the library which is used in an object-oriented programming environment, and is the aggregation of generally used classes (e.g., A class, B class, C class, . . . , extended A class) respectively having specific functions. Here, it should be noted that the class consists of a data structure and a function definition for handling similar data.

A Java™ applet 1403 shown in FIG. 14 tries to reduce a program size by using only necessary classes in the class library 1401. Here, it should be noted that in general several classes are previously prepared for the class library in consideration of the characteristic of the communication terminal in question. Besides, also an extended class (e.g., extended A class in FIG. 14) which is distinctive according to a terminal manufacturer, a provider and the like exists in the class library. On one hand, a class might not be previously prepared on the communication terminal, according to the kind thereof.

Therefore, because the Java™ applet 1403 cannot be executed if a class required for this applet does not exist in the class library 1401, it is necessary to newly obtain the required class. Here, it is judged by the applet administration task 4110 whether or not the class required to execute the applet exists in the class library of the communication terminal. In the case where the applet administration task 4110 recognizes the required class and obtains the recognized class if it does not exist in the own class library, an ADF (automatically defined function) file 1402 is referred.

Figure 15:
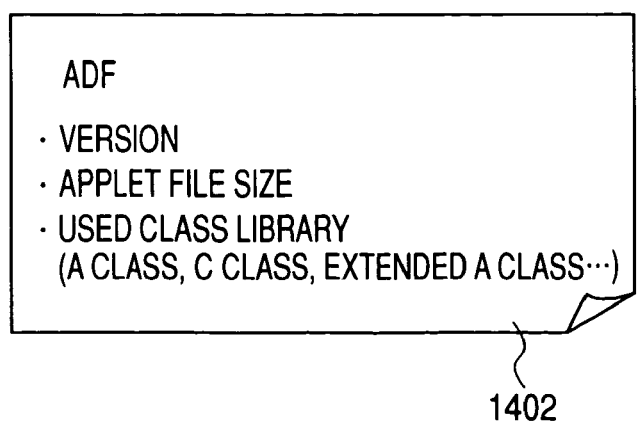
FIG. 15 is an explanatory diagram showing the configuration of an ADF (automatically defined function) file used in the terminal shown in FIG. 1.

FIG. 15 shows the configuration of the ADF file 1402. Here, the ADF file is the text file in which an applet operation condition prepared in the server of providing the applet has been described. As shown in FIG. 15, the version information of the corresponding applet, the file size of the applet, the class necessary for execution of the Java™ applet, and the like are described in the ADF file 1402. Thus, the applet administration task 4110 can know a sequence necessary to download the applet in question, by referring to the ADF file 1402.

Figure 16:
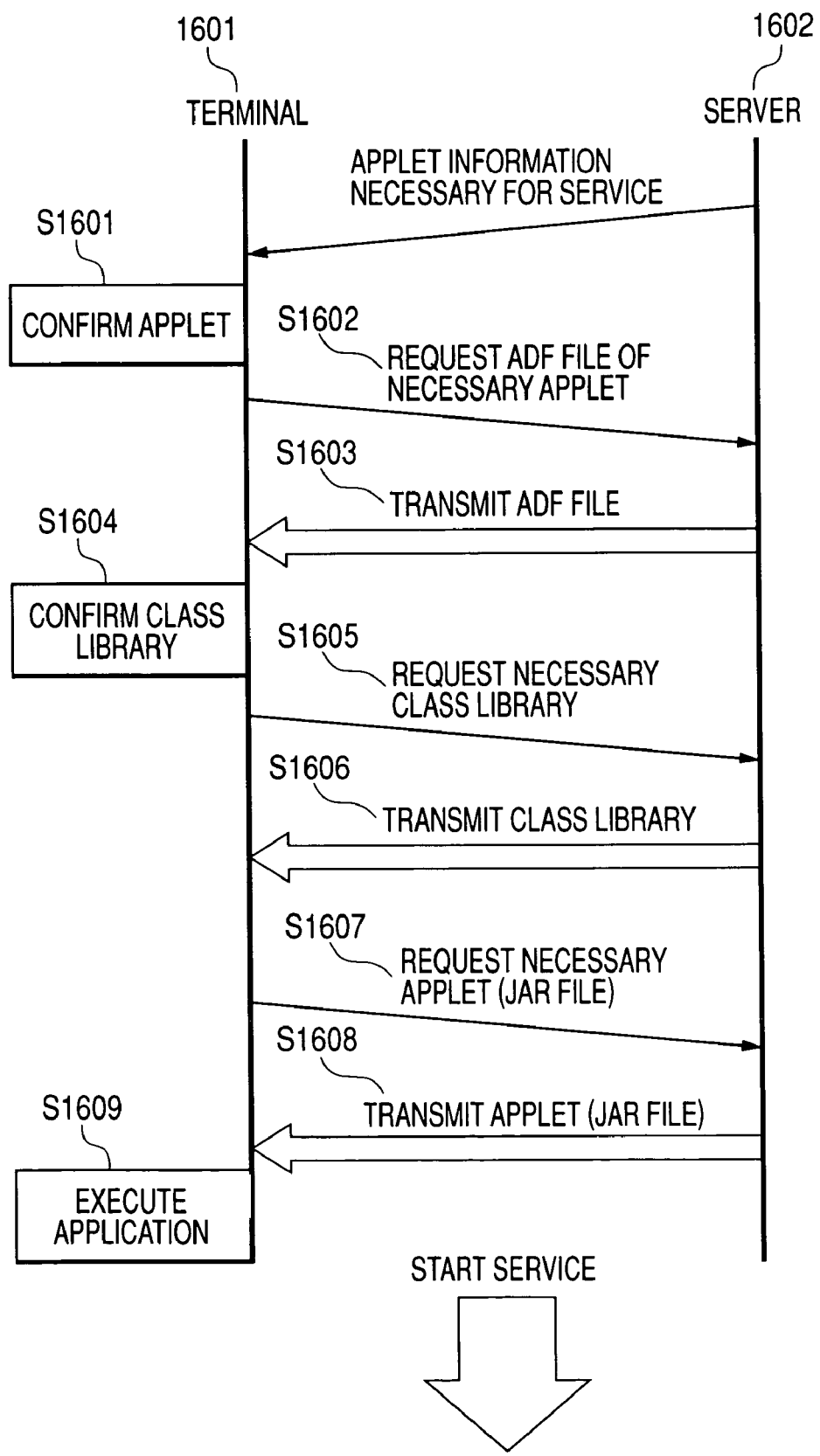
FIG. 16 is an explanatory diagram showing communication between the terminal shown in FIG. 1 and a lobby server.

FIG. 16 shows a communication sequence which is executed between a terminal 1601 and a server 1602 to obtain the Java™ applet necessary for services.

On condition that the connection is established between the terminal 1601 and the server 1602, the terminal 1601 obtains information concerning the required applet for a specific service from the server 1602. The applet administration task of the terminal 1601 judges whether or not the required applet exists in the terminal 1601 (step S1601). When the required applet exists, the terminal can obtain the service from the server by executing the existing applet.

On the other hand, when the required applet does not exist, it is necessary for the terminal 1601 to download the applet from the server 1602. Therefore, the terminal 1601 requests the ADF file to know beforehand whether or not the applet can be downloaded (step S1602). When such an ADF file request is received, the server 1602 transmits the ADF file corresponding to the applet to the terminal 1601 (step S1603).

When the ADF file is received, the applet administration task of the terminal 1601 refers to the ADF file and thus judges whether or not the applet can be downloaded and executed. For example, the applet file size described in the ADF file is compared with the applet storage memory of the terminal 1601 to judge whether or not the terminal 1601 has the applet storage memory area necessary to download the applet. Here, when the terminal 1601 does not have the necessary applet storage memory area, a series of procedures ends.

Moreover, it is judged whether or not the class necessary to execute the applet described in the ADF file exists in the class library of the terminal 1601 (step S1604). When the necessary class does not exist, the applet administration task requests the server 1602 of the necessary class (step S1605). When such a class request is received, the server 1602 transmits the requested class to the terminal 1601 (step S1606).

In a case where the necessary class is normally received and the environment for downloading the applet is put into place, the applet administration task of the terminal 1601 transmits an applet request to the server 1602 (step S1607). Then, when the applet request is received, the server 1602 actually transmits the applet to the terminal 1601 (step S1608). At that time, the applet is transmitted as a JAR (Java™ ARchiver) file which is the archive of plural files compressed through ZIP compression or the like. Thus, the terminal 1601 can execute the received applet (step S1609).

Incidentally, the server 1602 for Java™ control shown in FIG. 16 is set by a manufacturer of the terminal 1601, a software vendor concerning the terminal 1601, a service provider, or the like.

As above, the necessary Java™ applet can be downloaded to the terminal 1601 when the user of the terminal 1601 wishes the specific service from the server 1602.

FIG. 17 shows the network configuration that terminals A and B (corresponding to the communication terminals 200 and 220 in FIGS. 3 and 4) use a communication line and thus achieve the service according to the present embodiment through the Internet.

In FIG. 17, the terminals A and B mutually communicate with each other through the server on the Internet. In that case, it is assumed that a server 1701 acts as a lobby server.

Thus, the terminals A and B can achieve high-speed peer-to-peer inter-client communication by using the lobby server 1701.

The lobby server 1701 includes a servlet 1702. Here, the servlet 1702 which is a Java™ program is used to perform login administration of the client terminals A and B connected to the lobby server 1701 and also perform a server function process for receiving communication information from the terminal and then passing the received information on to the communication party terminal. That is, the servlet 1702 has a function to perform the login administration of the client terminals and a function to perform a relay process when the client terminals perform mutual communication.

More specifically, the terminal A starts the login process to the lobby server 1701 by using an inherent ID of the terminal A itself as a login authentication key (A1). In the present embodiment, for example, the telephone number of the terminal A which is stored in the address book 203a of the ROM 203 or a specific area such as the ROM 202 or the like by the VoIP service provider is used as the login authentication key.

Likewise, the terminal B performs the login process to the lobby server 1701 by using an inherent ID of the terminal B itself as the login authentication key (A2).

Each of the terminals A and B performs such an authentication operations by the applet which has been previously downloaded and in an excited condition in the terminal.

The applet of the terminal communicates with the servlet 1702 of the lobby server 1701 in one-to-one relation in accordance with a principle that the applet can connect and communicate only with the source host from which the applet itself is downloaded.

The lobby server 1701 checks the authentication keys transmitted from the respective applets of the terminals A and B, and then judges whether or not the terminals A and B start the communication services by the respective applets after the telephone call state of the VoIP or the global addresses of the respective terminals by the call connection protocol are beforehand known.

In that case, on the basis of the authentication keys respectively transmitted from the terminals A and B, a matching check is performed by a client database 1703 in the lobby server 1701 to judge what kinds of optional functions the respective client terminals have as additional services of the VoIP. Although it is not specifically shown in FIG. 17, in the client database 1703 of the lobby server 1701, global addresses, telephone numbers, optional service contracts, accounting information and the like of client users are classified as customer information, whereby database administration is performed as an object of each client user.

When the client terminals have the same service content as respective options, the lobby server 1701 accepts the authentications of both the client terminals A and B to respectively use these options. It only has to be able to use such an option (that is, the above authentication only has to become effective), based on a prior contract between the user of the client terminal and a VoIP service provider as the additional optional service of the VoIP.

Besides, the client database 1703 may be checked by using the global address of the client terminal as another means for authentication. In that case, it is possible to omit the sequence for transmitting the client's telephone number as the authentication key, whereby the present embodiment is applicable to a terminal having no telephone number.

When the authentication normally ends, the lobby server 1701 sets a through mode in the communication between the terminals A and B to change the operation states of the terminals A and B to an operation state for performing peer-to-peer inter-client communication (C1).

That is, in the through mode, the command transmitted in an XML format from the applet of the terminal A is once received by the lobby server 1701, and the received command is then transmitted to the terminal B. Likewise, the command transmitted from the terminal B is once received by the lobby server 1701, and then transmitted to the terminal A.

That is, the communication between the applet of the terminal and the lobby server 1701 is performed in accordance with the principle that the applet can connect and communicate only with the source host from which the applet itself is downloaded, whereby the command path for performing the peer-to-peer command communication between the client terminals A and B as performing the VoIP telephone call is resultingly formed.

FIG. 18 shows an example of the command to be transmitted/received in the peer-to-peer manner between the terminals A and B. Here, it should be noted that the shown command is transmitted/received to set the scroll positions of the Web browser between the terminals A and B to be the same.

As shown in FIG. 18, the command which is transmitted/received in the peer-to-peer manner between the terminals A and B in the present embodiment is defined by the SOAP which is the protocol for transmitting XML-based information.

The SOAP message is constructed by an envelope, a header and a body, and the characteristic portion of the present embodiment is included in the body (underlined in FIG. 18) of the SOAP message. For this reason, an explanation of the constructions of other known portions will be omitted.

The underlined portion in FIG. 18 is structured as <BrowsPosition>100</BrowsPosition>. Such a data type <BrowsPosition> indicates a parameter (i.e., the number of dots) showing from the dot position how many from the page head of the content whether only have to display the content in question on the Web browser screen in the case where the Web browser is being displayed. Here, it should be noted that, as well as the number of dots from the page head of the content, e.g., the number of text lines from the page head of the content may be used as a numerical value of the parameter.

Incidentally, even if the number of dots from the page head of the content has been designated, the Web browser often adjusts a text browsing width to a screen size and/or a window size. Therefore, such designation as above is meaningless if both the terminals cannot mutually recognize the respective parties' display capabilities.

For this reason, in order to show such a display capability, it is necessary as shown in FIG. 23 to provide a message such as <BrowsPixel>200,200</BrowsPixel> designating the display capability of the terminal included in the body of the SOAP message. Such a data type <BrowsPixel> indicates two parameters (i.e., "lateral parameter" and "longitudinal parameter") showing the maximum number of pixels capable of being displayed when the terminal shows the Web browser screen. Here, it should be noted that, as well as the number of dots from the page head of the content, e.g., the number of text characters (e.g., sizes of row and column) may be used as a numerical value of the parameter.

Various data types to be used in the above service have been previously parser-defined in the applet downloaded by the terminal, and the applet can recognize that the message is a service information packet by an identifier of the header of the message when the SOAP message is actually received.

Figure 19:
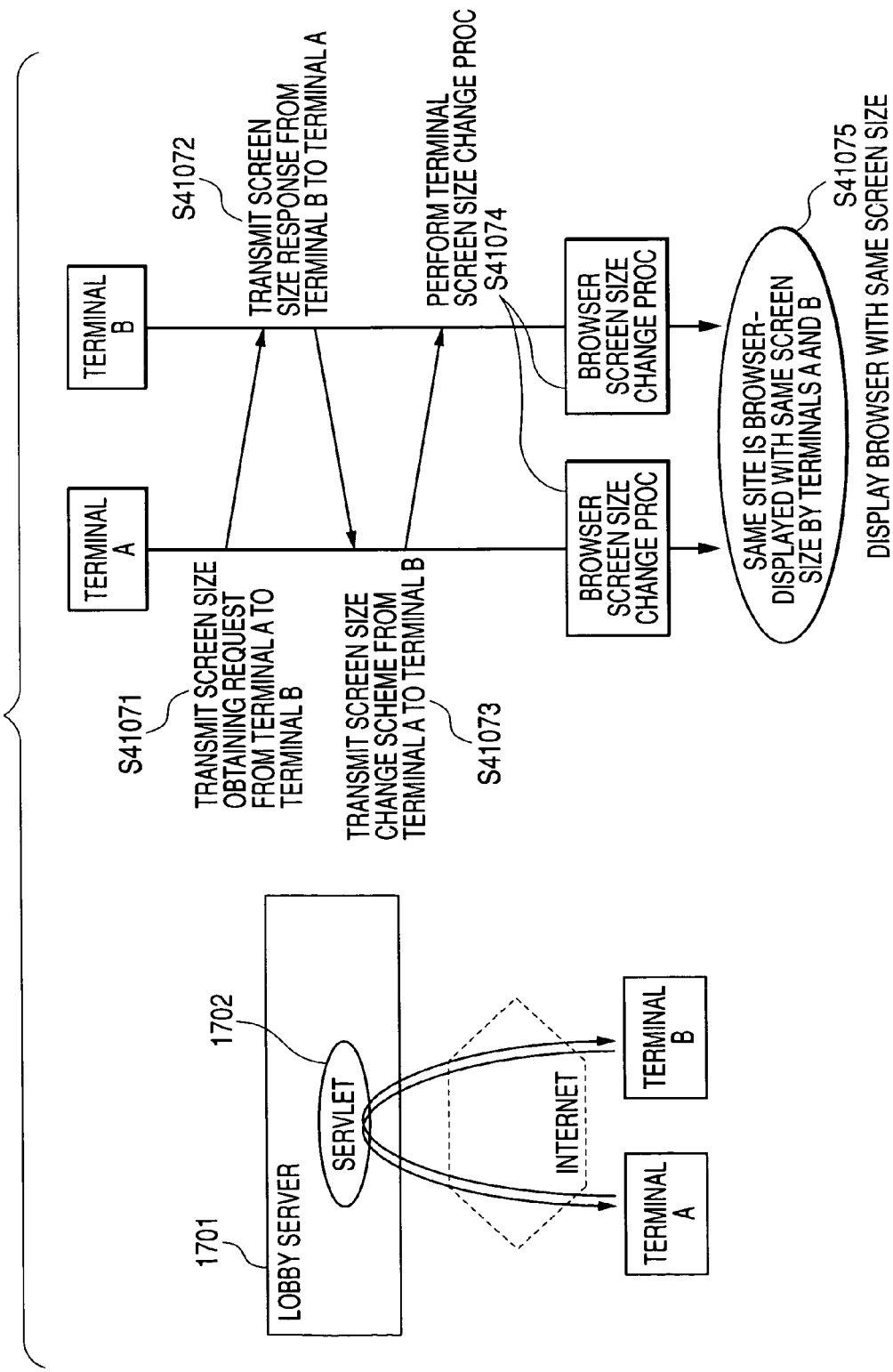
FIG. 19 is an explanatory diagram showing control for causing the terminals shown in FIG. 1 to mutually notify and change respective screen display sizes.

The right of FIG. 19 shows a command sequence to be executed until the terminals A and B open the same-size browsing screen, and the left of FIG. 19 shows a state that the terminals A and B are in communication with each other through the lobby server 1701. Here, it should be noted that the communication shown in FIG. 19 is started after the same Web page was displayed by the Web browsers of the terminals A and B in the above manner.

As shown in the right of FIG. 19, the terminal A first transmits a screen size obtaining request to the terminal B (step S41071). In that case, it is assumed that the terminal A mainly determines the screen size, and thus has to issue the screen size obtaining request as a screen restriction information to the terminal B. Moreover, it is assumed that the terminal which mainly determines the screen size is set to the terminal which first calls, and such a command of the screen size obtaining request is used as a trigger to start the command sequence.

Next, the terminal B transmits a command concerning the maximum number of pixels capable of performing the browser display to the terminal A, in consideration of the restriction of the own device (step S41072). At that time, the construction <BrowsPixel> (or similar construction) shown in FIG. 23 is used. Here, for example, the restriction includes a restriction which has to depend on the state of another application being displayed in the terminal. That is, in such a browser size synchronizing service, when another application is not displayed in the display screen of the terminal B, the number of pixels corresponding to the maximum size capable of performing the display on the terminal B may be allocated as the maximum number of pixels capable of performing the browsing, and the allocated number is returned as a response to the terminal A. Alternatively, when plural windows are displayed in parallel with the display of another application on the terminal, the number of pixels capable of performing the parallel displays may be determined as the number of pixels corresponding to the maximum size.

Thus, the terminal B transmits the number of pixels corresponding to the maximum size capable of being displayed to the terminal A as the response, and then the terminal A recognizes the maximum number of pixels capable of being displayed on the terminal B and compares it with the maximum number of pixels capable of being browser displayed on the terminal A itself. As the result of such a comparison, for example, when the size capable of being displayed on the terminal A is larger longitudinally and laterally than the size capable of being displayed on the terminal B, the size of the terminal B is determined as the number of pixels of the common (shared) screen.

In the present embodiment, it is explained that the same number of pixels is determined with respect to each of longitudinal and lateral directions. However, it might be more convenient for usability to set one of the number of longitudinal pixels and the number of lateral pixels to the number of pixels shared between the terminals, according to the content of a website to be browsed. In that case, one of the number of longitudinal pixels and the number of lateral pixels may be set to the shared number of pixels, while the other thereof may be determined as the maximum number of pixels of the screen on each terminal. That is, in the present embodiment, there is no specific restriction in case of determining the number of pixels.

How to determine the display screen sizes of the terminals A and B will be explained in more detail later.

Next, the determined common screen pixel number (i.e., the determined number of pixels of the common screen) is transmitted from the terminal A to the terminal B as a screen size change method (step S41073), and the corresponding screen size change process is performed on each of the terminals A and B (step S41074), whereby the browser display can be performed with the same number of screen pixels on both the terminals A and B (step S41075).

Figure 20:
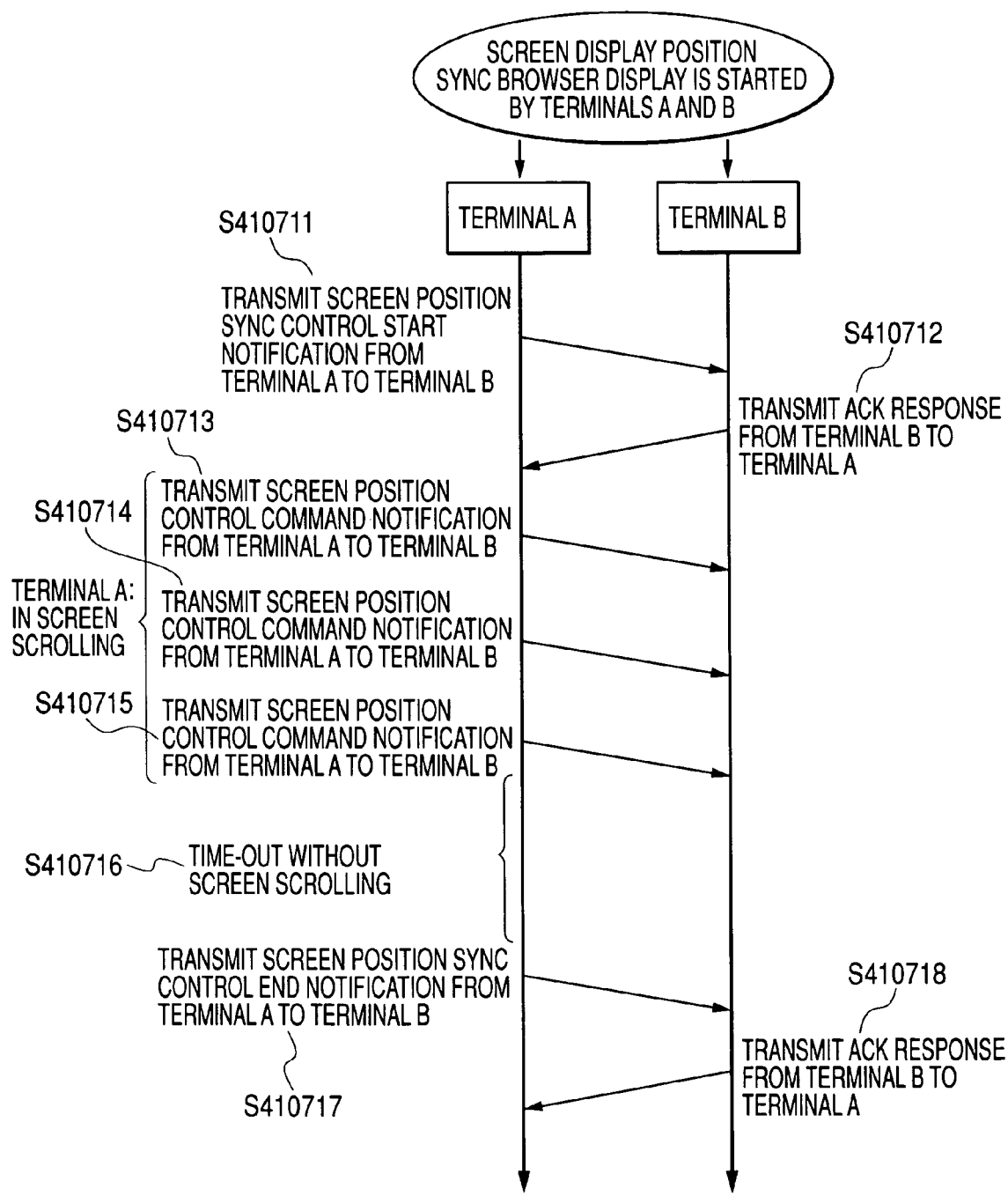
FIG. 20 is an explanatory diagram showing synchronous control for screen display positions to be performed by the respective terminals shown in FIG. 1.

FIG. 20 shows a command sequence to be executed, after the same-size Web browser screen size was determined on both the terminals A and B, to mutually notify the screen display position between the terminals A and B and scroll the screen to synchronize the screen display position when the screen display position on one terminal is changed.

First, the terminal A transmits a screen position sync control start notification to the terminal B (step S410711). In that case, it is assumed that a scroll operation is first performed on the terminal A. Here, it should be noted that, when the scroll keys 215b of the operation unit 215 or a not-shown user interface such as a mouse are provided, the scroll operation may be performed by using such a pointing device on the terminal A. Moreover, it is needless to say that the same control can be achieved even when the scroll operation is first performed on the terminal B.

Then, when the terminal B is in an operation state of accepting the screen position sync control start notification received from the terminal A, that is, when the scroll operation on the terminal A is acceptable for the terminal B, the terminal B returns an ACK to the terminal A (step S410712).

Incidentally, when a user on the terminal B performs scrolling at the same timing as that on the scrolling on the terminal A, also the terminal B transmits the screen position sync control start notification to the terminal A. Here, when these screen position sync control start notifications (i.e., commands) collide with each other, both the terminals A and B do not perform ACK response. At that time, it may be controlled not to scroll the browser display of the terminal itself so that inconformity of the screen display position between the terminals A and B do not occur.

After the terminal B returned the ACK to the terminal A (step S410712), mainly the terminal A appropriately transmits screen display position control commands to the terminal B. That is, the screen display position control command is first notified from the terminal A to the terminal B (step S410713). Here, this command is transmitted approximately in sync with the timing of the scroll operation, that is, the timing that the scroll key 215b on the operation unit 215 is depressed by the user. At that time, the construction <BrowsPosition> (or similar construction) shown in FIG. 18 is used. In FIG. 20, the command notification operations of three times are performed to the terminal B in accordance with the scroll operations of three times (steps S410713, S410714 and S410715).

When there is no user operation on the terminal A for a certain period of time or more (step S410716), a time-out process is performed. When such a time-out occurs, a screen position sync control end notification is transmitted from the terminal A to the terminal B (step S410717), and a corresponding ACK is returned from the terminal B to the terminal A (step S410718). The reason why such a process is necessary is to once end the sync control sequence when there is no scroll operation on the one terminal for a while, and then enable the other terminal to have the initiative if it intends to perform the scroll operation.

Therefore, unlike FIG. 20, if the scroll operation is performed on the terminal B, the process in which the relation between the terminals A and B is inverted is performed, whereby the scroll operation on the terminal B can be controlled as the scroll display on the terminal A.

Figure 21:
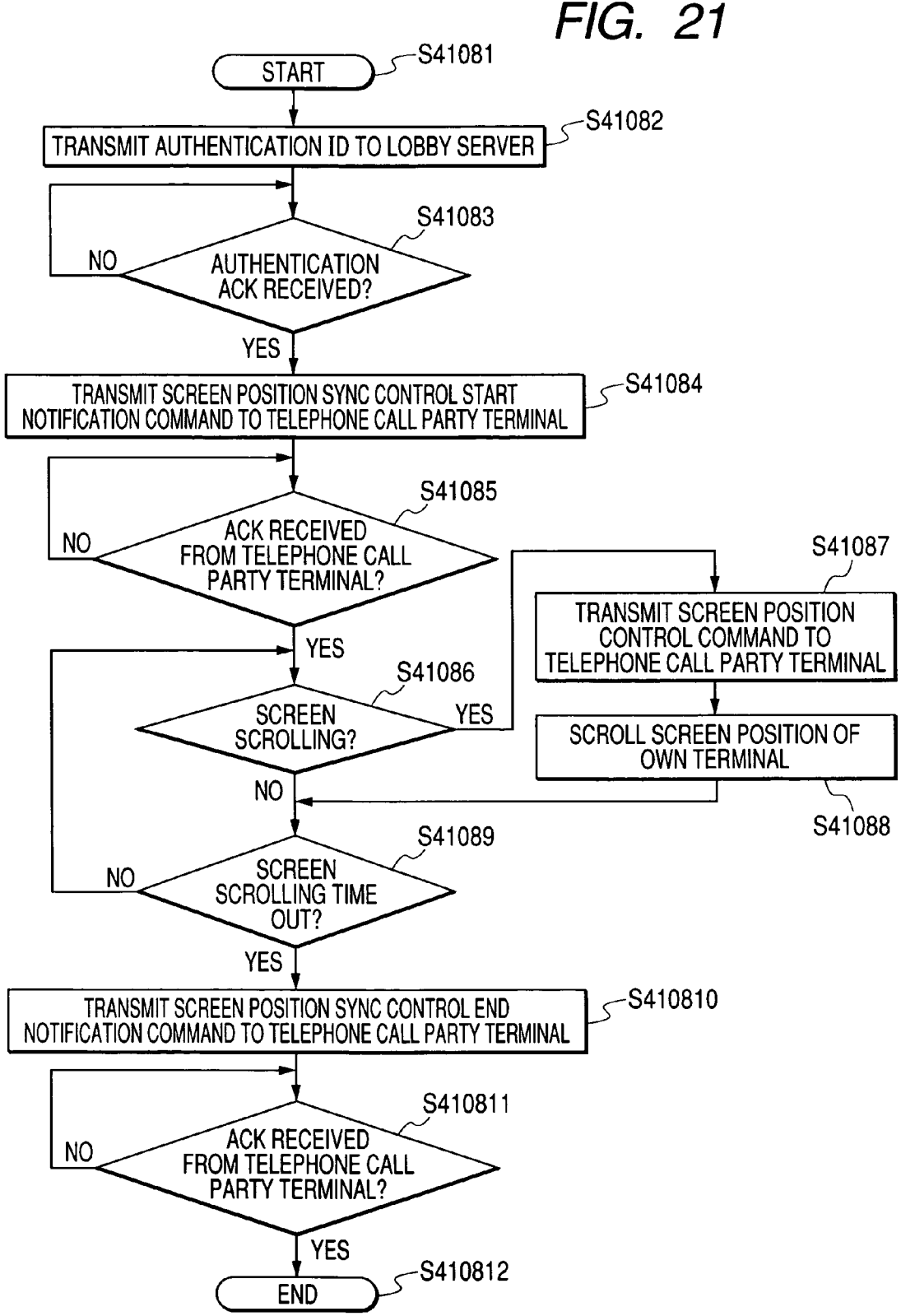
FIG. 21 is a flow chart showing the synchronous control for the screen display positions to be performed by the respective terminals shown in FIG. 1.

Next, FIG. 21 shows concrete control of the Java™ applet for determining the screen display position on the Web browser. Here, it is assumed that the applet has already been in an operating state on the JVM 4108.

When a screen display position sync sequence starts (step S41081), an authentication ID command is transmitted to the lobby server 1701 (step S41082). As described above, the telephone number of the client terminal is used as the authentication ID. The data type of the telephone number to be used as the authentication ID is defined as an authentication ID of character string data in the SOAP message, whereby a command format can be defined. Here, it should be noted that such authentication may be omitted, and, even in this case, the main control according to the present embodiment is not influenced.

Then, an authentication ACK command is received from the lobby server 1701 (step S41083). When, the authentication ACK is received, a screen position sync control start command is transmitted to the telephone call party (step S41084). At this stage, when it is judged by the lobby server 1701 that the command between the client terminals is the packet to be communicated between these terminals, it is controlled to pass the command from the one client terminal through the lobby server 1701 and directly transmit it to the other client terminal. Then, an ACK command responsive to the screen position sync control start command is transmitted from the communication party terminal (i.e., the other client terminal) to the own terminal (i.e., the one client terminal) (step S41085).

When the ACK is received, it is further judged whether or not the screen scroll operation is performed (step S41086). When it is judged that the screen scroll operation is performed, the flow branches to a step S41087.

In the step S41087, a screen position control command is transmitted to the party terminal. Then, a screen scroll operation of the own terminal is performed (step S41088). Here, it should be noted that the pixel size of the screen to be scrolled on the own terminal is the same as the number of pixels indicated to the party terminal through the command transmission.

Meanwhile, when it is judged that the screen scroll operation is not performed (step S41086), it is further judged whether or not a timeout duration lapses for a certain period of time (step S41089). When it is judged that the timeout duration lapses for the certain period of time, the flow branches to a step S410810. Meanwhile, when it is judged that the timeout duration does not lapse for the certain period of time, the flow again returns to the step S41086 to judge whether or not the screen scroll operation is performed.

In the step S410810, the process in the case where the timeout duration lapses for the certain period of time is performed. More specifically, when any user operation is not performed for a certain period of time, as described above, it is controlled to once end the sync control sequence, and enable the scroll display on the terminal opposite to the terminal on which the scroll operation was performed previously. In other words, a screen position sync control end command is transmitted to the telephone call party terminal.

Subsequently, it is judged in a step S410811 whether or not an ACK responsive to the screen position sync control end command is received from the party terminal. When the ACK is received, the entire control sequence ends (step S410812).

Although the process in FIG. 21 is explained as the process of the terminal (i.e., the terminal A) on the side that the Web browser is scrolled, the scroll operation on the terminal B can be of course controlled as the scroll operation on the terminal A if the relation between the terminals A and B is inverted. Moreover, it is needless to say that the control explained in the above flow chart can be mainly performed by the terminal opposite to the terminal which performs the control explained in the above flow chart.

FIG. 22 shows a user interface to be displayed when the screen display position sync control is performed through the communication between the terminals A and B. More specifically, FIG. 22 shows a display example on the display unit 214, the left of the user interface displays discrimination information (e.g., party name, party telephone number, communication time, etc.) of the telephone call party in the IP telephone 2201, and the right thereof displays a Web browser 2202. The Web browser 2202 includes a content display area 2204 for displaying general contents and an area 2203 (occasionally called a mode line or the like) for displaying the state of the Web browser.

Through the above display sync control, the display screen which is quite the same as the browser display screen of the party terminal being in the telephone call through the Internet is synchronously displayed in the content display area 2204.

Here, when the part corresponding to the net content displayed on the browser display screen is scrolled through the scroll operation of the own terminal, a message "SAME PARTS ARE BEING DISPLAYED ON TELEPHONE CALL PARTY" is displayed in the area 2203, thereby notifying the user who is performing the scroll operation on the own terminal that both the users of the own terminal and the party terminal see the same part on the respective Web browser screen. Besides, when the leading-side terminal for scrolling is changed and the scrolling of the own terminal is controlled by the party terminal, a message "SAME PARTS ARE BEING DISPLAYED BY OPERATION OF TELEPHONE CALL PARTY" may be displayed on the mode line 2203. That is, it is possible to further improve usability by appropriately controlling the change of leading side and the synchronization of user messages.

As above, when the URL of the Internet resource (i.e., net content) is transmitted from one terminal to the other terminal while these terminals are in telephone call, these terminals can browse the same page automatically.

Moreover, in the case where the terminals which are in the telephone call browse the same page, when the browser screen display on one of the terminals is scrolled, the equivalent browser screen display on the other of the terminals is automatically scrolled. That is, it is possible to perform the display sync control so that the same part of the Internet resource being currently browsed by both the telephone call terminals is automatically displayed at any time, whereby it is possible to certainly assure that the same information of the Internet resource being currently browsed can be transmitted to both the users of the respective terminals being in the telephone call.

In the above explanation, the terminals A and B being in the telephone call respectively change the display screen sizes. Such display screen size change will be explained in detail with reference to FIG. 24.

Figure 24:
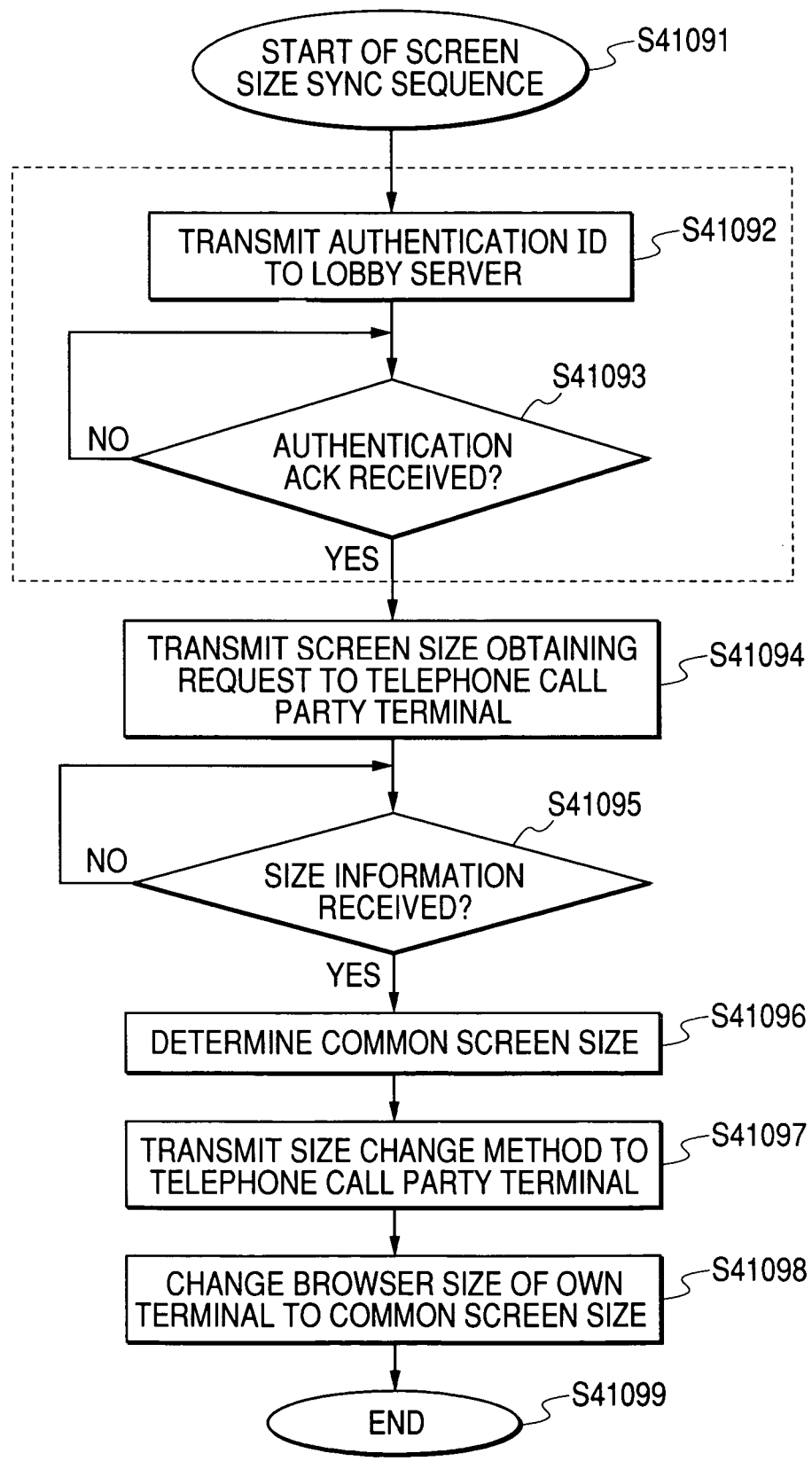
FIG. 24 is a flow chart showing the control for causing the terminal shown in FIG. 1 to notify and change the screen display size.

FIG. 24 shows display screen size sync control (step S41091) in the same manner as in FIG. 21.

In steps S41092 and S41093 surrounded by a broken line in FIG. 24, an authentication process to be performed between the terminal and the lobby server 1701 is performed. Here, the process concretely performed in the steps S41092 and S41093 is equivalent to that performed in the steps S41082 and S41083 of FIG. 21. Moreover, if both the display screen size sync control process in FIG. 24 and the scroll sync control process (i.e., screen display position sync control) in FIG. 21 are performed, one of the authentication processes in the display screen size sync control process and the scroll sync control process can be occasionally omitted. In such a state, because the authentication process in the steps S41092 and S41093 is the same as that already explained, whereby the detailed explanation of the authentication process will be omitted hereinafter.

Thus, the actual display screen size sync control process starts by transmitting a screen size obtaining request to the telephone call party terminal (step S41094). At this stage, when it is judged by the lobby server 1701 that the command between the client terminals is the packet to be communicated between these terminals, it is controlled to pass the command from the one client terminal through the lobby server 1701 and directly transmit it to the other client terminal (see FIG. 17).

Then, when a screen size information command is received from the party terminal (step S41095), the number of pixels of the common screen is determined in the same manner as described above (step S41096). For example, the number of pixels of the common screen is determined appropriately in conformity with the terminal of the smaller number of screen pixels (or the terminal of which the number of screen pixels cannot be changed). In the present invention, a scheme itself for determining the number of pixels of the common screen can be arbitrarily adopted according to one of ordinary skill in the art.

In a step S41097, the determined number of pixels of the common screen (determined common screen pixel number) is transmitted to the party terminal as a size change method (message). Here, in the screen size information notification in the step S41095 or the post-change screen size information notification in the step S41097, the construction <BrowsPixel> (or similar construction) shown in FIG. 23 can be used.

In a step S41098, the determined common screen pixel number is reflected as the browser size of the own terminal. The Web browser 4102 (FIG. 13) changes the browser display screen pixel number (i.e., the number of pixels of the screen displayed on the browser) in response to the received pixel number information. Although the detailed explanation of such a screen pixel number change process will be omitted, the Web browser 4102 itself may include an interface for executing this process, or a script in which such a method of this process has been described may be displayed on the browser. That is, how to change the screen pixel number change process in the Web browser 4102 is not specifically limited. In any case, the display screen size sync control sequence ends (step S41099).

However, even after the series of sequence ended, there is a possibility that the screen size is changed again due to some kind or another situation change during the telephone communication. For example, when the number of windows corresponding to the applications displayed on the screen of the terminal changes, the maximum pixel number (i.e., the maximum number of pixels of the screen capable of being displayed by the browser) changes. In that case, the terminal side on which the situation change occurs acts as the terminal having the initiative and repeats the similar display screen size sync control sequence beginning from the step S41091 in FIG. 24. Thus, it is possible to correspond to various screen changes in the telephone call.

FIG. 25 shows an example of a user interface to be displayed when the terminals A and B perform the mutual communication and thus perform the screen size sync control. As well as FIG. 22, FIG. 25 shows a display example on the display unit 214, the left of the user interface displays discrimination information (e.g., party name, party telephone number, communication time, etc.) of the telephone call party in the IP telephone (2201), and the right thereof displays the Web browser (2202).

FIG. 25 shows a case where the telephone call partner (terminal B) to which the telephone call is performed through the Internet (IP network) 100 is a cellular telephone or the like which merely has the small-size screen. That is, in FIG. 25, the screen size sync control between the partner A having the display unit having the larger screen as shown in FIG. 1 and the terminal B is performed.

In FIG. 25, symbol V denotes the number of pixels in the longitudinal direction of the screen displayed on the terminal A, and symbol H denotes the number of pixels in the lateral direction of the same screen, and it should be noted that such parameters are determined as the screen pixel number size through the above screen size sync control.

The pixel numbers V and H of the longitudinal-direction and lateral-direction pixels of the screen shown in FIG. 25 may be represented by, in addition to the representation method using one construction of <BrowsPixel>, a representation method using respectively different constructions such as <BrowsPixel.vertical> and <BrowsPixel.horizontal> for the respective directions in the SOAP message. By such a method, even when a change in only the longitudinal or lateral direction becomes necessary, there is a possibility that the change process can be easily performed.

Incidentally, in FIG. 25, instead of the mode line, a dialog (or sub window) 2205 on the Web browser display 2202 notifies the user of the screen size sync control. That is, as shown in FIG. 25, after the screen sync control sequence was performed, the dialog (or sub window) 2205 displays a message "SCREEN SIZE IS MATCHED WITH TELEPHONE CALL PARTY", whereby the user can know that the screen size is matched with that on the communication partner.

Moreover, the term "screen size" is used on the dialog (or sub window) 2205 for the user in consideration of usability (or user friendliness). Here, it is needless to say that this term indicates "the number of pixels of the screen" to be handled in the above screen size sync control according to the present embodiment.

Moreover, in addition to the above case where the screen size sync control successfully ended, a dialog message "SCREEN SIZE CANNOT BE SYNCHRONIZED WITH TELEPHONE CALL PARTY" can be displayed when the size capable of being synthesized does not satisfy the actual number of pixels as the result of the screen size sync control sequence.

Moreover, it might be more convenient for usability to set one of the number of longitudinal pixels and the number of lateral pixels to the number of pixels shared between the terminals, according to the content of a website to be browsed. In that case, one of the number of longitudinal pixels and the number of lateral pixels may be set to the shared number of pixels, while the other thereof may be determined as the maximum number of pixels of the screen on each terminal, and a dialog message "LATERAL SCREEN SIZE IS MATCHED WITH TELEPHONE CALL PARTY" may be displayed.

As above, when the same Web page is browsed by the two terminals by performing the screen size sync control, it is possible to automatically synchronize between these terminals the numbers of the longitudinal-direction and lateral-direction pixels-displayed in common, the number of longitudinal-direction pixels displayed in common, or the number of lateral-direction pixels displayed in common. In any case, it is possible by performing the screen size sync control according to the present embodiment to certainly assure that the same information of the Internet resource being currently browsed can be transmitted to both the users of the respective terminals being in the telephone call.

In order to assure the sameness of the Internet resource information being currently browsed, in the strict sense, also the display screen sizes in addition to the display positions (i.e., the scroll positions on the display screens) have to be the same between the terminals being in the telephone call. This is because, for example, a general user in the telephone call tends to indicate the part that the user wishes to cause the telephone call party user to pay attention to, through telephone calls such as "a photograph at the lower right of the browsed page", "third line from the bottom" and the like which are premised on the same browser content. Therefore, by performing the display position sync control and the screen size sync control according to the present embodiment, the same Internet resource information including display position information and display screen size information is surely transmitted to both the users, whereby it is possible to remarkably improve user-friendliness.

As explained above, according to the present invention, in the communication terminal which is connected to the IP network and performs the telephone call in the predetermined IP telephone system, the control method for the above communication terminal, and the control program for the above communication terminal, the browsing means for browsing the Internet resource, the Internet resource sharing means for sharing the same Internet resource by the browsing means and the browsing means of the in-call party communication terminal to which the telephone call is being performed, and the display screen sync control means for controlling the browsing means and the other browsing means of the in-call party communication terminal to form the same display state. Thus, it is possible to certainly assure that the same information of the Internet resource being currently browsed can be transmitted to both the users of the respective terminals being in the telephone call, and it is also possible to remarkably improve the user-friendliness.

In particular, in the control by the above display screen sync control means, the display position of the Internet resource by the browsing means is controlled in sync with that by the other browsing means of the in-call party communication terminal. Thus, the same information including the display position information and the display screen size information is surely transmitted to both the users who are currently in the telephone call, whereby it is possible to remarkably improve user-friendliness.

What is claimed is:

1. A communication terminal which is connected to an IP (Internet Protocol) network and performs a telephone call by an SIP (Session Initiation Protocol), comprising:
   a browsing unit configured to browse Internet resources;
   an Internet resource sharing unit configured to, in order to share a same Internet resource by the browsing unit and another browsing unit of an in-call party communication terminal to which the telephone call from the communication terminal is being performed, transmit to the in-call party communication terminal a file including a URL of a Web page being displayed by the browsing unit and a browser activation instruction by using an IP address of the in-call party communication terminal obtained when the telephone call starts by transmitting a telephone number of the in-call party communication terminal designated by a dialing operation of a user to an SIP server; and
   a display screen sync control unit configured to i) transmit displayed area information which specifies a displayed area of the Web page displayed on the browsing unit and scrolled information which indicates a scrolled position of the Web page displayed on the browsing unit to the in-call party communication terminal when the displayed area of the Web page is scrolled by a scrolling operation of the browsing unit, ii) to receive, from the in-call party communication terminal, displayed area information and scrolled information of a Web page corresponding to the URL displayed on the another browsing unit of the in-call party communication terminal, and iii) to scroll the displayed area of the Web page in accordance with the received displayed area information and scrolled information so that a same display state is formed on the browsing unit and the another browsing unit of the in-call party communication terminal,
   wherein the Internet resource sharing unit determines a screen size by receiving a number of maximum-sized pixels capable of being displayed from the in-call party communication terminal and comparing the received number with a maximum number of pixels capable of being displayed by the own communication terminal, and
   wherein the display screen sync control unit exchanges the scrolled information in response to a scroll operation by the browsing unit or the another browsing unit.

2. A communication terminal according to claim 1, wherein said display screen sync control unit is mounted by using a hardware-independent program object capable of being transmitted/received on the Internet.

3. A control method for a communication terminal which is connected to an IP (Internet Protocol network and performs a telephone call by an SIP (Session Initiation Protocol), said method comprising:
   a browsing step of a browsing unit of said communication terminal browsing an Internet resource;
   an Internet resource sharing control step of, in order to share a same Internet resource by the browsing unit and another browsing unit of an in-call party communication terminal to which the telephone call from the communication terminal is being performed, transmitting to the in-call party communication terminal a file including a URL of a Web page being displayed by the browsing unit of the communication terminal and a browser activation instruction by using an IP address of the in-call party communication terminal obtained when the telephone call starts by transmitting a telephone number of the in-call party communication terminal designated by a dialing operation of a user to an SIP server; and a display screen sync control step of transmitting displayed area information which specifies a displayed area of the Web page on the browsing unit of the communication terminal and scrolled information which indicates a scrolled position of the Web page on the browsing unit of the communication terminal to the in-call party communication terminal when the displayed area of the Web page is scrolled by a scrolling operation of the browsing step, receiving, from the in-call party communication terminal, displayed area information and scrolled information of a Web page corresponding to the URL displayed on the another browsing unit of the in-call party communication terminal, and to scroll the displayed area of the Web page in accordance with the received displayed area information and scrolled information so that a same display state is formed on the browsing unit of the communication terminal and the another browsing unit of the in-call party communication terminal, wherein the Internet resource sharing control step determines a screen size by receiving a number of maximum-sized pixels capable of being displayed from the in-call party communication terminal and comparing the received number with a maximum number of pixels capable of being displayed by the own communication terminal, and wherein the display screen sync control step exchanges the scrolled information in response to a scroll operation by the browsing unit or the another browsing unit.

4. A control method according to claim 3, wherein said display screen sync control step is achieved by using a hardware-independent program object capable of being transmitted/received on the Internet.

5. A computer-readable storage medium on which is stored a control program for a communication terminal which is connected to an IP (Internet Protocol) network and performs a telephone call by an SIP (Session Initiation Protocol), said program comprising computer executable code that, when executed, performs the steps of:

a browsing step of a browsing unit of said communication terminal browsing an Internet resource;

an Internet resource sharing control step of, in order to share a same Internet resource by the browsing unit of the communication terminal and another browsing unit of an in-call party communication terminal to which the telephone call from the communication terminal is being performed, transmitting to the in-call party communication terminal a file including a URL of a Web page being displayed by the browsing unit of the communication terminal and a browser activation instruction by using an IP address of the in-call party communication terminal obtained when the telephone call starts by transmitting a telephone number of the in-call party communication terminal designated by a dialing operation of a user to an SIP server; and a display screen sync control step of transmitting displayed area information which specifies a displayed area of the Web page on the browsing unit of the communication terminal and scrolled information which indicates a scrolled position of the Web page on the browsing unit of the communication terminal to the in-call party communication terminal when the displayed area of the Web page is scrolled by a scrolling operation of the browsing step, receiving, from the in-call party communication terminal, displayed area information and scrolled information of a Web page corresponding to the URL displayed on the another browsing unit of the in-call party communication terminal, and to scroll the displayed area of the Web page in accordance with the received displayed area information and scrolled information so that a same display state is formed on the browsing unit of the communication terminal and the another browsing unit of the in-call party communication terminal, wherein the Internet resource sharing control step determines a screen size by receiving a number of maximum-sized pixels capable of being displayed from the in-call party communication terminal and comparing the received number with a maximum number of pixels capable of being displayed by the own communication terminal, and wherein the display screen sync control step exchanges the scrolled information in response to a scroll operation by the browsing unit or the another browsing unit.

6. A computer-readable storage medium according to claim 5, wherein said display screen sync control step is achieved by using a hardware-independent program object capable of being transmitted/received on the Internet.

* * * * *